US012769392B1

(12) United States Patent
Brooks et al.

(10) Patent No.: US 12,769,392 B1
(45) Date of Patent: Oct. 20, 2026

(54) DYNAMIC GENERATION AND RENDERING OF A VIRTUAL REALITY ENVIRONMENT ADAPTED TO FEATURES AND CONSTRAINTS OF A PHYSICAL ENVIRONMENT

(71) Applicant: FMR LLC, Boston, MA (US)

(72) Inventors: Seth Warren Brooks, Westwood, MA (US); Kevin Sweeney, West Caldwell, NJ (US); Cecelia Kay Brooks, Pelham, NH (US); Erich Umar, Kittery, ME (US); Matthew N. Savage, Brooklyn, NY (US); Hangyu Wang, Cary, NC (US); David Martin, Natick, MA (US); Jamie Barras, Apex, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/411,931

(22) Filed: Dec. 8, 2025

(51) Int. Cl.
*G06F 3/01* (2006.01)
*G06T 19/00* (2011.01)

(52) U.S. Cl.
CPC .............. *G06F 3/013* (2013.01); *G06F 3/017* (2013.01); *G06T 19/006* (2013.01); *G06T 2200/24* (2013.01)

(58) Field of Classification Search
CPC ....... G06F 3/013; G06F 3/017; G06T 19/006; G06T 2200/24
See application file for complete search history.

(56) References Cited

U.S. PATENT DOCUMENTS

| | | | |
|---|---|---|---|
| 10,853,647 | B2 | 12/2020 | Smith et al. |
| 11,328,491 | B2 | 5/2022 | Weinheimer et al. |
| 11,556,961 | B2 | 1/2023 | Zavesky et al. |
| 11,612,817 | B1 | 3/2023 | McCain et al. |
| 11,676,345 | B1 | 6/2023 | Bhushan et al. |
| 11,699,268 | B1 | 7/2023 | Bhushan et al. |
| 11,759,711 | B2 | 9/2023 | McCain et al. |
| 11,776,206 | B1 | 10/2023 | Gupta et al. |
| 11,853,533 | B1 | 12/2023 | Chor et al. |

(Continued)

FOREIGN PATENT DOCUMENTS

| | | | |
|---|---|---|---|
| WO | 2005015345 | A2 | 2/2005 |
| WO | 2024253782 | A1 | 12/2024 |

*Primary Examiner* — Daniel Samwel
(74) *Attorney, Agent, or Firm* — Cesari and McKenna, LLP

(57) ABSTRACT

Methods and apparatuses for dynamically generating and rendering a virtual reality environment adapted to features and constraints of a surrounding physical environment. A server captures features of (i) a physical environment in which a headset device is located and (ii) objects in the physical environment. The server generates a virtual environment that includes virtual objects based upon an identity of a user of the headset device, the physical environment features, and the physical object features. The server configures user interaction elements in the virtual environment based upon user behavior, user preferences, and features of the virtual environment. The server causes the headset device to render the virtual environment. The server detects an alert message and transforms the alert message based upon the user behavior, the user preferences, and the features of the virtual environment. The server causes the headset device to display the transformed alert message.

22 Claims, 13 Drawing Sheets

(56) References Cited

U.S. PATENT DOCUMENTS

| | | | |
|---|---|---|---|
| 12,147,591 | B2 | 11/2024 | Dascola et al. |
| 12,177,258 | B2 | 12/2024 | Buck |
| 12,210,679 | B1 | 1/2025 | Watkins |
| 12,277,301 | B2 | 4/2025 | Gu et al. |
| 12,347,040 | B2 | 7/2025 | Silverman et al. |
| 2006/0074788 | A1 | 4/2006 | Grizack |
| 2011/0050699 | A1 | 3/2011 | Dawson et al. |
| 2016/0124499 | A1* | 5/2016 | Shiu ...................... H04L 51/224 345/173 |
| 2017/0192620 | A1* | 7/2017 | Kim ................... G02B 27/0179 |
| 2018/0174344 | A1* | 6/2018 | Joo ........................ H04N 13/30 |
| 2019/0217198 | A1 | 7/2019 | Clark et al. |
| 2019/0353904 | A1* | 11/2019 | Ardovino ........... G02B 27/0172 |
| 2022/0075452 | A1* | 3/2022 | Bokides .................. G06F 3/016 |
| 2022/0404621 | A1 | 12/2022 | Phillips et al. |
| 2023/0138204 | A1* | 5/2023 | Penugonda .......... G02B 27/017 715/705 |
| 2023/0169733 | A1 | 6/2023 | Krishna et al. |
| 2023/0177855 | A1 | 6/2023 | Singh et al. |
| 2023/0205313 | A1 | 6/2023 | Potetsianakis et al. |
| 2023/0215083 | A1 | 7/2023 | Hoffman-John et al. |
| 2023/0260219 | A1 | 8/2023 | Doken |
| 2023/0298244 | A1 | 9/2023 | Chan et al. |
| 2023/0377301 | A1 | 11/2023 | Olia et al. |
| 2024/0272782 | A1 | 8/2024 | Pastrana Vicente et al. |
| 2024/0354555 | A1 | 10/2024 | Knipfing et al. |
| 2025/0022050 | A1 | 1/2025 | Fraser |
| 2025/0029337 | A1 | 1/2025 | Lindskog et al. |
| 2025/0068789 | A1 | 2/2025 | Kunikawa |
| 2025/0078972 | A1 | 3/2025 | Gormley |
| 2025/0104342 | A1 | 3/2025 | Viswanathan et al. |
| 2025/0111619 | A1 | 4/2025 | Singh |
| 2025/0166294 | A1 | 5/2025 | Bertolli et al. |

* cited by examiner

100

DYNAMIC GENERATION AND RENDERING OF A VIRTUAL REALITY ENVIRONMENT ADAPTED TO FEATURES AND CONSTRAINTS OF A PHYSICAL ENVIRONMENT

TECHNICAL FIELD

This application relates to methods and apparatuses, including computer program products, for dynamically generating and rendering a virtual reality environment adapted to features and constraints of a surrounding physical environment.

BACKGROUND

The advancement of three-dimensional (3D) computing interfaces, such as extended reality hardware and software applications, has enabled the experience in which a user's real-world viewing perspective is replaced by, or enhanced with, a virtual 3D environment (also called spatial computing). Generally, the term "extended reality" encompasses all different types of virtual experiences, including but not limited to virtual reality (VR), augmented reality (AR), mixed reality (MR), and others. Typically, a user wears a headset (e.g., goggles, glasses) or similar apparatus that includes specialized display devices to render the virtual environment to the user, and the headset can include certain components (e.g., gyroscope(s), accelerometer(s), magnetometer(s), etc.) that detect and capture the user's head movements in order to update the virtual environment in response to the movements in a seamless, real-time manner.

However, current virtual experiences suffer from a lack of dynamic, real-time customization, as well as limits on the mechanisms with which the virtual environment integrates with the physical environment of the user. In spatial computing, users need to be able to see data that is not only timely but also placed into a timely space. For transactions, users need to intuitively interact in a multi-step sequence (e.g., init, verify, confirm) in a way that they can be confident in their selections, to see where they are in the transaction flow and be sure of what they have selected (with an opportunity to see and correct errors).

To have a confident interaction/transaction with virtual environment applications, users need:

1. The ability to personalize data (e.g., web personalization) and see what they need to see to be confident in their decisions.
2. The ability to have data and/or user interface elements arranged in a way that makes sense in a sequence (or in parallel process).
3. The ability to personalize physical interactions and control of objects.
4. The ability to have their attention brought to important data in the right place (e.g., alerts, focus on warnings) dependent on what data, layout arrangement, and physical interaction controls are set in the virtual environment. For example, two-dimensional (2D) vs. 3D vs. four dimensional (4D) have different x-y-z-a coordinates).
5. The ability to view confirmation of their successful or failed interactions/transactions of a multi-channel communication.

SUMMARY

The methods and systems described herein beneficially overcome the above-referenced technical limitations of existing virtual experiences and applications by providing a hardware-software platform that includes a spatial application layout and interaction manager that takes in (a) physical space and nearby objects, (b) user-specific interaction preferences (e.g., biometric measures, sound indicators, gestures vs eye movements), and (c) the data source capabilities (e.g., available layouts for data objects and user preferences for the data objects, sound and vibration) in order to (1) provide timely (and attention-focusing) alerts in the virtual environment, (2) allow users to interact with their physical/virtual environment and the alerts using multiple methods; and (3) enable the user to go through a multi-step process (e.g., a purchase transaction) with virtual environment layout and user interface elements that ensure they are executing the process properly and with confidence.

The invention, in one aspect, features a system for dynamically generating and rendering a virtual reality environment adapted to features and constraints of a surrounding physical environment. The system includes a server computing device with a memory for storing computer-executable instructions and a processor that executes the computer-executable instructions. The server computing device captures a plurality of features of (i) a physical environment in which a virtual reality headset device is located and (ii) one or more objects in the physical environment. The server computing device generates, for display in the virtual reality headset device, a virtual environment that includes one or more virtual objects based upon an identity of a user of the headset device, the physical environment features, and the physical object features, including adapting the virtual environment to conform to one or more constraints of the physical environment. The server computing device configures one or more user interaction elements in the virtual environment based upon one or more of user behavior, user preferences, and features of the virtual environment. The server computing device causes the virtual reality headset device to render the virtual environment for display to the user. The server computing device detects an alert message intended for the user. The server computing device transforms the alert message for display in the virtual environment based upon the user behavior, the user preferences, and the features of the virtual environment. The server computing device causes the virtual reality headset device to display the transformed alert message in the virtual environment to focus the user's attention on the transformed alert message.

The invention, in another aspect, features a computerized method of dynamically generating and rendering a virtual reality environment adapted to features and constraints of a surrounding physical environment. A server computing device captures a plurality of features of (i) a physical environment in which a virtual reality headset device is located and (ii) one or more objects in the physical environment. The server computing device generates, for display in the virtual reality headset device, a virtual environment that includes one or more virtual objects based upon an identity of a user of the headset device, the physical environment features, and the physical object features, including adapting the virtual environment to conform to one or more constraints of the physical environment. The server computing device configures one or more user interaction elements in the virtual environment based upon one or more of user behavior, user preferences, and features of the virtual environment. The server computing device causes the virtual reality headset device to render the virtual environment for display to the user. The server computing device detects an alert message intended for the user. The server computing device transforms the alert message for display in the virtual environment based upon the user behavior, the user preferences, and the features of the virtual environment. The server computing device causes the virtual reality headset device to display the transformed alert message in the virtual environment to focus the user's attention on the transformed alert message.

Any of the above aspects can include one or more of the following features. In some embodiments, capturing features of the physical environment comprises scanning the physical environment using a sensor of the virtual reality headset device to identify spatial dimensions of the physical environment, identifying the physical environment and loading spatial dimensions of the physical environment from a data store, or both. In some embodiments, capturing features of objects in the physical environment comprises detecting objects in the physical environment and scanning the detected objects using a sensor of the virtual reality headset device to identify physical attributes of the detected objects, identifying objects in the physical environment and loading physical attributes of the detected objects from a data store, or both. In some embodiments, capturing features of objects in the physical environment comprises tracking movement of the objects in the physical environment.

In some embodiments, the virtual environment generated for display in the virtual reality headset device comprises a vector-based three-dimensional (3D) model. In some embodiments, adapting the virtual environment to conform to one or more constraints of the physical environment comprises modifying one or more spatial dimensions of the vector-based 3D model to align with corresponding spatial dimensions of the physical environment.

In some embodiments, the user behavior comprises biometric information collected by the virtual reality headset device, gaze information collected by the virtual reality headset device, and gesture information collected by the virtual reality headset device. In some embodiments, the user preferences comprise data display preferences, object display preferences, and interaction method preferences.

In some embodiments, transforming the alert message for display in the virtual environment comprises: identifying a type of the alert message; determining a visual layout for the alert message in the virtual environment based upon the alert message type; and rendering the alert message in the virtual environment for display to the user based upon the visual layout, the user behavior, the user preferences, and the features of the virtual environment. In some embodiments, transforming the alert message for display in the virtual environment comprises merging one or more user-specific data elements with content of the alert message. In some embodiments, the server computing device detects a user interaction with one or more of the virtual objects in the virtual environment; determines a transaction to be initiated based upon one or more features of the user interaction; and initiates the transaction, including causing the virtual reality headset device to display a transaction confirmation message in the virtual environment based upon the user behavior, the user preferences, and the features of the virtual environment.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
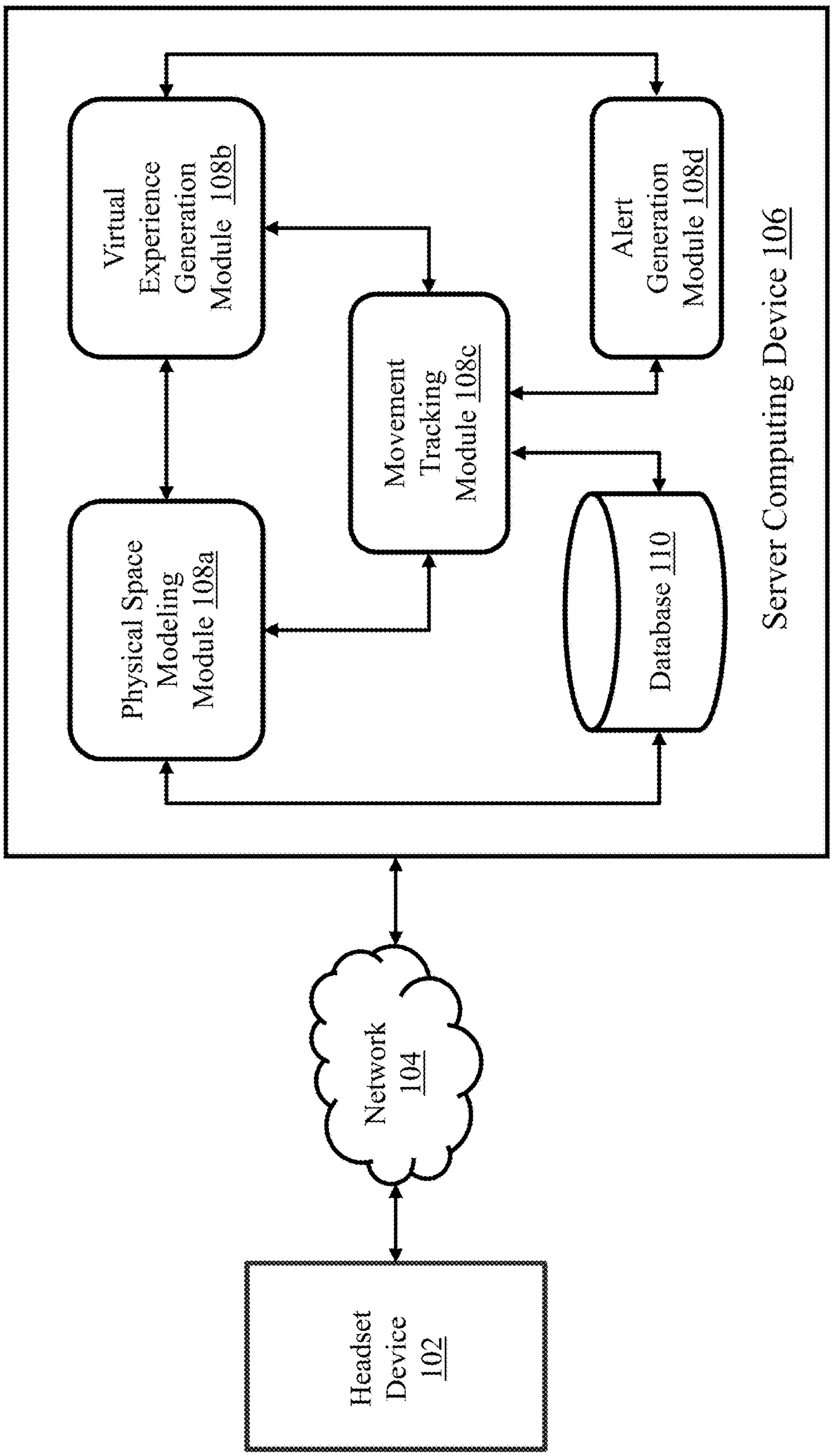
FIG. 1 is a block diagram of a system for dynamically generating and rendering a virtual reality environment adapted to features and constraints of a surrounding physical environment.

FIG. 1 is a block diagram of system 100 for dynamically generating and rendering a virtual reality environment adapted to features and constraints of a surrounding physical environment. System 100 includes headset device 102, communication network 104, and computing device 106 that includes physical space modeling module **108*a*, virtual experience generation module 108*b*, movement tracking module 108*c*, alert generation module 108*d*, and database 110**.

Headset device 102 comprises an apparatus (e.g., headset, goggles, glasses, etc.) that enables a user to view a 3D virtual environment (such as a virtual reality (VR) environment, an augmented reality (AR) environment, a mixed reality (MR) environment, and/or an extended reality (XR) environment). Exemplary headset devices 102 can include, but are not limited to, the Meta Quest 3™ available from Meta Platforms, Inc., the Apple® Vision Pro™ available from Apple, Inc., and the HTC Vive XR Elite™ available from HTC Corp. Headset device 102 connects to server computing device 106 via communication network 104 to receive data corresponding to a rendered virtual environment from server computing device 106 for display to a user wearing the device 102. In one embodiment, headset device 102 is coupled to server computing device 106 via a wireless network connection to enable the user wearing headset device 102 to move within and through a physical environment while remaining communicatively connected to server computing device 106 and without being constrained by cables or other types of physical connectors.

In some embodiments, headset device 102 includes a central processing unit (CPU), one or more graphics processing units (GPUs), a memory (e.g., solid state/flash RAM), one or more microphones (e.g., to capture audio from the user and/or the surrounding environment), one or more speakers (e.g., to play audio to the user), one or more cameras (e.g., cameras facing outward from the headset device that capture the physical environment around the user), a network interface (e.g., Bluetooth™, Wi-Fi™) for wirelessly connecting the headset device 102 to network 104, one or more sensors (e.g., accelerometers, gyroscopes, controller sensors, iris trackers), battery, application software, and an interior-facing display apparatus (e.g., one or more micro-OLED displays that can display a virtual environment to the wearer via magnification lenses).

In some embodiments, headset device 102 is coupled to one or more control devices which can enable a user wearing headset device 102 to interact with the virtual environment being rendered and displayed to the user. For example, a control device can be an apparatus such as a joystick, keypad, haptic controller, glove, and the like that the user holds and manipulates to provide input to server computing device 106 for interaction with the 3D virtual environment-including manipulation of virtual objects within the 3D environment. In this context, the user can provide input in many ways, including but not limited to performing gestures with the control device, pressing one or more buttons on the control device, moving the control device in relation to objects in the virtual environment, or any combination of the above. In some embodiments, the user can interface with a plurality of control devices (e.g., a joystick in each hand) to provide input to server computing device 106.

Communication network 104 enables headset device 102 to connect to server computing device 106 for the purpose of dynamically generating and rendering a virtual reality environment adapted to features and constraints of a surrounding physical environment as described herein. Network 104 is typically comprised of one or more wide area networks, such as the Internet and/or a cellular network, and/or local area networks. In some embodiments, network 104 is comprised of several discrete networks and/or subnetworks (e.g., cellular to Internet). Headset device 102 can also be configured to connect to other remote computing devices (e.g., web servers, content repositories, externally hosted generative AI models, service-oriented application programming interfaces (APIs), etc.) in addition to server computing device 106. For example, headset device 102 can connect via network 104 to server computing device 106 and/or other computing devices to, e.g., download application software for installation on the headset device 102, upload data associated with configuration or operation of the headset device 102, and retrieve content for display on headset device 102, among other functions Server computing device 106 is a device including specialized hardware and/or software modules that execute on one or more processors and interact with one or more memory modules of server computing device 106, to receive data from other components of the system 100, transmit data to other components of system 100, and perform functions for dynamically generating and rendering a virtual reality environment adapted to features and constraints of a surrounding physical environment as described herein. As mentioned above, server computing device 106 includes physical space modeling module 108*a*, virtual experience generation module 108*b*, movement tracking module 108*c*, and alert generation module 108*d* that execute on one or more processors of computing device 104. In some embodiments, modules 108*a*, 108*b*, 108*c*, and 108*d* are specialized sets of computer software instructions programmed onto one or more dedicated processors in server computing device 106 and can include specifically designated memory locations and/or registers for executing the specialized computer software instructions.

Although modules 108*a*, 108*b*, 108*c*, and 108*d* are shown in FIG. 1 as executing within a single server computing device 106, in some embodiments the functionality of modules 108*a*, 108*b*, 108*c*, and 108*d* can be distributed among a plurality of computing devices. As shown in FIG. 1, server computing device 106 enables modules 108*a*, 108*b*, 108*c*, and 108*d* to communicate with each other in order to exchange data and instructions for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein. In some embodiments, server computing device 106 is in a separate physical location from the user wearing headset device 102—in these embodiments, headset device 102 establishes a wireless connection to network 104 (e.g., via Wi-Fi or Bluetooth), and network 104 connects to server computing device 106 via a wide area network, such as the Internet. In still other embodiments, some or all of the functionality of server computing device 106 as described herein can be included in headset device 102, such that headset device 102 can be configured to render the 3D virtual environment, detect input from the user wearing the device 102, and perform other functions described herein. In some embodiments, headset device 102 and/or server computing device 106 can include graphical processing unit (GPU) hardware that is configured to render the 3D virtual environment. Exemplary functionality of modules 108*a*, 108*b*, 108*c*, and 108*d* is described in detail below.

Database 110 is a computing module embedded in and/or coupled to server computing device 106 and which is configured to receive, generate, store, and provide for retrieval specific segments of data relating to the process of dynamically generating and rendering a virtual reality environment adapted to features and constraints of a surrounding physical environment as described herein. In some embodiments (as shown in FIG. 1), all or a portion of database 110 can be integrated with server computing device 106. In some embodiments, database 110 can be located on a separate computing device or devices, available either local connection or 110 connection (e.g., cloud-based services). In some embodiments, all or a portion of database 110 can be integrated into headset device 102. Database 110 can comprise one or more data repositories configured to store portions of data used by other components of system 100, as will be described in greater detail below. In some embodiments, database 110 stores computing files in memory and/or on disk. For example, database 110 can be accessed remotely via a LAN/WAN, or database 110 can be internal to server computing device 106.

Figure 2:
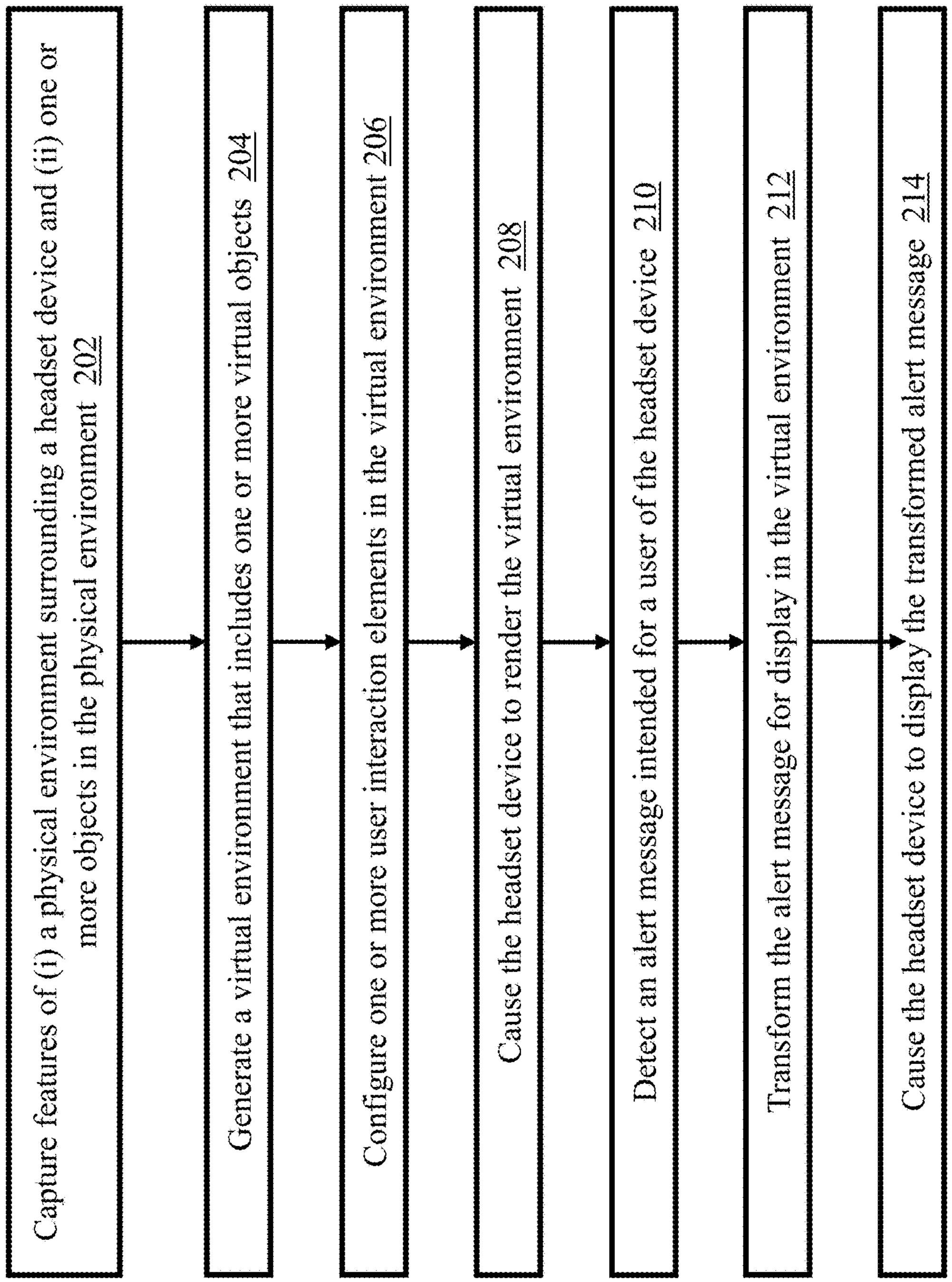
FIG. 2 is a flow diagram of a computerized method of dynamically generating and rendering a virtual reality environment adapted to features and constraints of a surrounding physical environment.

FIG. 2 is a flow diagram of a computerized method 200 of dynamically generating and rendering a virtual reality environment adapted to features and constraints of a surrounding physical environment, using system 100 of FIG. 1. As can be appreciated, headset device 102 can provide functionality to enable a wearer of the device 102 to launch and interact with software applications, either installed locally on device 102 or made available by server computing device 106. During operation, headset device 102 executes a software application to generate a virtual environment and display the virtual environment to the wearer of the headset device 102 via an interior display (i.e., micro-OLED screens embedded inside the housing of the headset device). In some embodiments, the virtual environment comprises a full virtual reality (VR) environment—where the user's view of the surrounding physical environment is entirely replaced with a virtual environment. In some embodiments, the virtual environment comprises an augmented reality (AR), extended reality (XR), or mixed reality (MR) environment—where the user sees elements of both the surrounding physical environment and the generated 3D virtual environment. As can be appreciated, the virtual environment can include one or more objects, e.g. three-dimensional virtual objects positioned within the environment and with which the user can interact. The software application executing on headset device 102 can further display user interface elements to the user (e.g., menus, icons, buttons, etc.) as part of the virtual environment so that the user can perform a variety of functions, such as configuring the headset device, providing input to the executing software application, and so forth.

As the user of the headset device 102 interacts with the virtual environment and/or moves within the physical environment, the headset device 102 can capture one or more data elements, including but not limited to: (i) data associated with execution of software application that is rendering the virtual environment to the user; (ii) data associated with the virtual environment being displayed to the user; (iii) data associated with the user operating the headset device 102; (iv) data associated with the location, position, orientation, and/or movement of the headset device 102 within the physical space; (v) data associated with the physical space (e.g., physical features, dimensions, layout, walls, doors); and (vi) data associated with the location, position, movement, identity, and/or physical features of one or more physical objects in the physical environment.

At step 202, physical space modeling module **108*a* captures a plurality of features of (i) a physical environment in which a virtual reality headset device (i.e., headset device 102) is located and (ii) one or more objects in the physical environment. In some embodiments, physical modeling module 108*a* is configured to retrieve one or more of the above-referenced data elements-such as dimensional constructs (i.e., room dimensions including but not limited to width, ceiling height and floor height) and other features of a physical environment in which the headset device 102 is located and/or object features—from database 110. As can be appreciated, the dimensional constructs and associated physical environment data define the boundaries in which virtual objects can be manipulated by the user in the virtual environment. In some embodiments, a virtual object may be able to be manipulated outside of the boundaries of the virtual environment—in these cases, the object can be displayed with a visual indicator (such as a highlight or ghosting effect) that indicates the virtual object is outside of the physical space dimensions captured by the physical space modeling module 108*a***.

To determine one or more of the physical features of the space to be modeled, physical space modeling module **108*a* can perform one or more of a plurality of functions. In some embodiments, physical environment features of the physical space may have already been determined and stored in, e.g., database 110. In these embodiments, physical space modeling module 108*a* can be configured to instruct headset device 102 to determine an identity of the physical space in order to retrieve the pre-stored physical environment features from database 110. For example, the user of headset device 102 can scan a bar code or quick response (QR) code in proximity to the physical space being modeled by system 100 (e.g., a QR code affixed to a wall or door of a room that comprises the physical space). The user of headset device 102 can scan the QR code using, e.g., a camera or sensor of the headset device 102 to determine an identity of the physical space, and the physical space modeling module 108*a* can retrieve stored physical environment features from database 110that are associated with the identity. In some embodiments, headset device 102 can determine an identity of the physical space using other techniques—for example, when the headset device 102 connects to, e.g., a wireless network in or near the physical space, a component of the wireless network (such as a router or access point) can transmit the physical space identity to the headset device 102. In another example, the headset device 102 can use an identifier associated with the wireless network component (e.g., IP address, MAC address) to look up a physical space identity in database 110**.

In some embodiments, the user may be entering an unrecognized physical space and/or a physical space that does not have any pre-stored environment features. In these embodiments, the user of headset device 102 can scan the physical space using cameras and/or sensors of the headset device 102 which dynamically capture the physical environment features. For example, the user can move around the physical space and rotate their head so that the cameras/sensors of the headset device 102 can view the physical space from different angles and positions to detect and measure the physical environment features (such as spatial dimensions, location/position of objects, etc.). In some embodiments, module **108*a* can generate a vector-based 3D model of the physical environment based on the scan data for storage in database 110. In some embodiments, module 108*a* is configured to store the detected physical environment features for the unrecognized space in database 110—thereby enabling others to retrieve the features for the physical space during subsequent uses of the headset device 102 in the physical space. Physical space modeling module 108*a*** can store the physical environment features in a variety of spatial data formats such as strict dimensional values, point clouds (e.g., E57 files, PCD files), or mesh-based formats (e.g., OBJ files, GLTF/GLB files).

To determine one or more of the physical features of the objects located within the physical space, physical space modeling module **108*a* can perform one or more of a plurality of functions. In some embodiments, physical space modeling module 108*a* retrieves the dimensional constructs of physical objects (such as the spatial dimensions for furniture or desk surfaces, chairs, balls, cubes, wands, etc.) and other features from storage systems that store the data (such as database 110). Physical space modeling module 108*a* coordinates with movement tracking module 108*c*** to track the vector information (i.e., location, direction of movement, velocity) for the objects in a 3D spatial environment. In some embodiments, the physical features of the objects can also include physical properties of the object (such as whether an object is wood or metal).

In some embodiments, features of one or more of the objects in the physical environment may have already been determined and stored in, e.g., database 110. In these embodiments, physical space modeling module 108*a* can be configured to instruct headset device 102 to determine an identity of the physical objects in order to retrieve the pre-stored physical object features from database 110. For example, the user of headset device 102 can scan a bar code, quick response (QR) code, or radio-frequency ID (RFID) tag affixed to the object(s) using, e.g., a camera or sensor of the headset device 102 to determine an identity of the object, and the physical space modeling module 108*a* can retrieve stored physical features from database 110 that are associated with the object identity.

In some embodiments, the user may encounter an unrecognized object and/or an object that does not have any pre-stored features. In these embodiments, the user of headset device 102 can scan the object using cameras and/or sensors of the headset device 102 which dynamically capture the physical features of the object. For example, the user can pick up the object and/or stand near the object and rotate their head so that the cameras/sensors of the headset device 102 can view the object from different angles and positions to detect and measure the physical object features (such as spatial dimensions). In some embodiments, the user of headset device 102 can also interact with a user interface displayed by the headset device 102 to input certain object features that may not be readily detected by scanning (e.g., material the object is made from). Based upon the scan data, physical space modeling module 108*a* can generate a vector-based 3D model for the object using, e.g., flat to 3D image scanning and/or native 3D image scanning. In some embodiments, physical space modeling module 108*a* is configured to store the detected object features (and/or the generated vector-based 3D model) for the unrecognized object in database 110—thereby enabling others to retrieve the features for the object during subsequent uses of the headset device 102 in the physical space.

Physical space modeling module 108*a* provides the physical environment feature data and the physical object feature data (including, but not limited to, one or more 3D models generated from the feature data) to virtual experience generation module 108*b*. At step 204, module 108*b* generates, for display in the virtual reality headset device, a virtual environment that includes one or more virtual objects based upon an identity of a user of the headset device, the physical environment features, and the physical object features. In some embodiments, the user may be asked to log in to the headset device 102 by, e.g., providing authentication credentials (e.g., username/password, PIN, etc.) via a user interface displayed in headset device 102. In some embodiments, after receiving the authentication credentials, headset device 102 can connect to server computing device 106 and/or one or more other remote computing devices to authenticate the user and retrieve information associated with the user (e.g., user identity, user profile, account information, employment information, user interface display/input preferences, virtual environment display preferences, alert display preferences, etc.). In some embodiments, headset device 102 can store the authentication credentials and/or user information in local memory.

Figure 3:
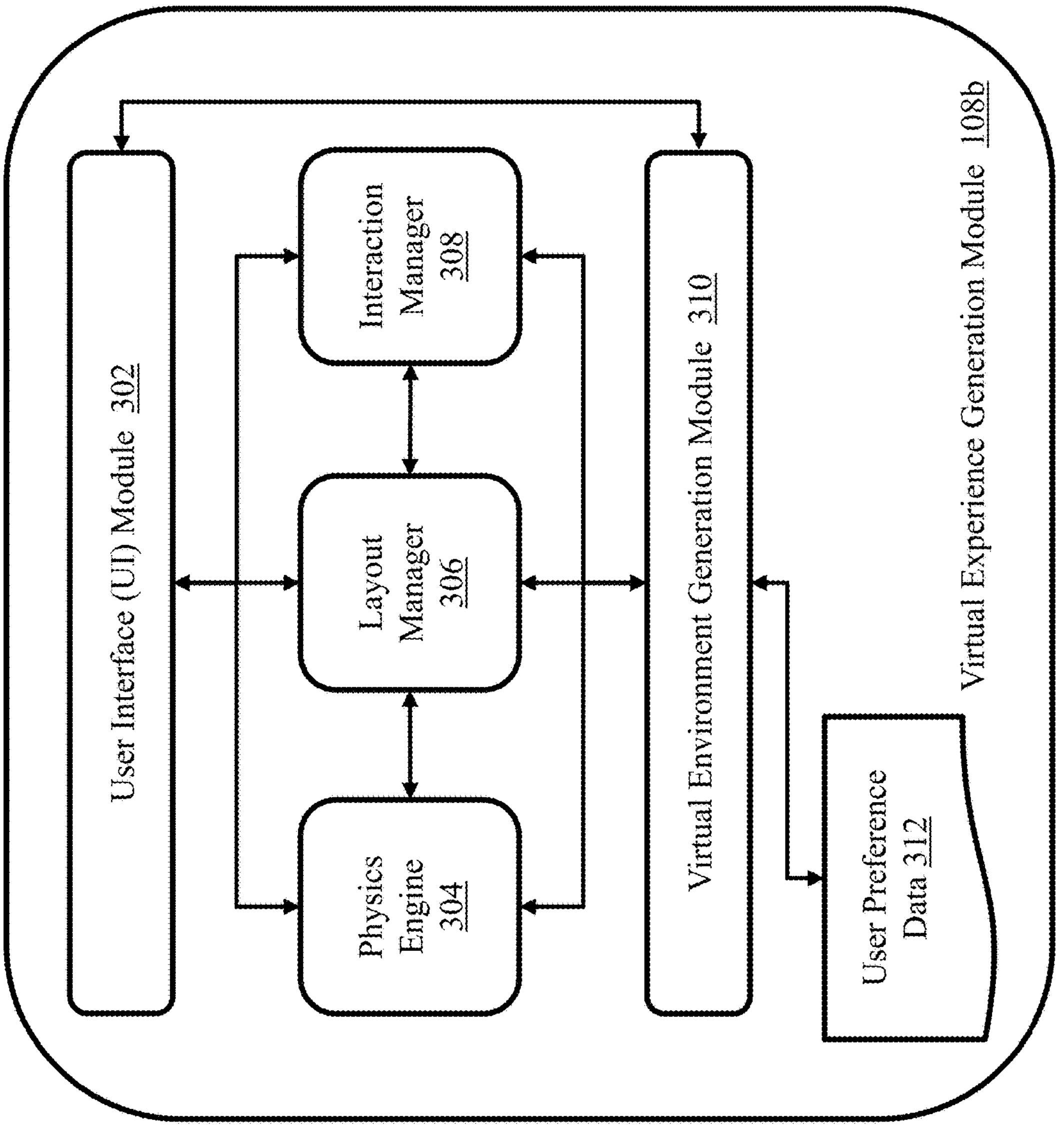
FIG. 3 is a detailed block diagram of the virtual experience generation module.

FIG. 3 is a detailed block diagram of the virtual experience generation module 108*b* of FIG. 1. As shown in FIG. 3, the virtual experience generation module 108*b* includes user interface (UI) module 302, physics engine 304, layout manager 306, interaction manager 308, virtual environment generation module 310, and user preference data 312. During generation of the virtual environment and virtual objects for display to the user of the headset device 102, virtual experience generation module 108*c* is configured to use the components 302, 304, 306, 308, and 310 to adapt the virtual environment so that the virtual environment conforms to one or more constraints of the physical environment and/or the physical objects present in the physical environment.

User interface module 302 is configured to generate and display graphical user interface (GUI) elements (e.g., menus, alert messages, input elements, icons, etc.) to the user of headset device 102. In some embodiments, UI module 302 displays the GUI elements as an overlay on the 3D virtual environment, such that the user can view the GUI elements and manipulate a cursor, pointer, or other UI element (e.g., using gestures, gaze, controllers/joysticks etc.) to interact with the GUI elements.

Physics engine 304 is configured to receive and/or generate one or more physics profiles for the virtual environment and/or virtual objects in the virtual environment and apply the physics profiles to the virtual environment and objects that are being interacted with and manipulated by the user of headset device 102. In some embodiments, physics engine 304 can retrieve one or more physics profiles from database 110 and/or one or more remote computing devices. Generally, physics profiles define the attributes of scanned physical objects and corresponding virtual objects, as well as the physics-based properties that physics engine 304 and virtual environment generation module 301 apply to virtual object(s) in a virtual environment (e.g., a mixed reality space). In some embodiments, the physics profile includes properties such as weight, relative gravity (e.g., so that a virtual ball thrown may either drop quickly to the ground or go into orbit with a low speed), elasticity of surfaces, acoustic and resistance properties of materials. For example, the 'air' in the virtual environment can be set with a certain viscosity, which affects the speed with which virtual objects and/or user interface elements can be moved in the environment (e.g., a higher viscosity results in slower movement, while a lower viscosity results in faster movement). In another example, the elasticity of a surface of a scanned physical object can be manipulated in the physics profile, which changes the velocity that virtual objects interacting and colliding with those surfaces are repelled (e.g., a metal table could have a trampoline-type bounce). In yet another example, gravity settings defined in the physics profile may be set to result in certain virtual objects exhibiting a zero-gravity behavior (e.g., the objects 'float' or stay where they are), or a gravity level may be set to have virtual objects and/or GUI elements cascade downward based on a gravitational vector. It should be appreciated that other types or categories of physical properties can be used within the scope of the technology described herein. In some embodiments, the physics profile can refer to 3D models and/or physical features of the physical environment and physical objects as stored in database 110 (as described previously).

In some embodiments, certain properties of a virtual object can be configured to align with actual physical properties of the corresponding physical object represented by the virtual object. For example, a virtual object can comprise a baseball with a physics profile that conforms to an actual baseball's appearance, weight, surface material, stitching, etc. In other embodiments, certain properties of a virtual object can be configured to diverge from actual properties of the corresponding physical object represented by the virtual object. For example, the physics profile may be configured to enable wooden objects to float in mid-air and have a brassy 'gong' sound when struck-which is different from how such objects would behave in a real-world physical environment.

As mentioned above, physics engine 304 applies one or more physics profiles to the virtual environment and/or virtual objects displayed to the user of headset device 102 as part of rendering the virtual environment to the user. In some embodiments, physics engine 304 coordinates with virtual environment generation module 310 to leverage the applied physics profiles to change, e.g., motion, placement, and/or reaction of virtual objects as the user is manipulating or interacting with the objects.

Layout manager 306 is configured to manage both data availability and data personalization for a given virtual environment and/or virtual application. In some embodiments, layout manager 306 determines the type and content of data that is available to be used with or applied to certain virtual environment features or virtual objects. For example, different data elements can be retrieved by layout manager 306 depending upon a specific application being used by the user of headset device 102—e.g., if a user is interacting with a stock market trading application, layout manager 306 can retrieve real-time market data (e.g., pricing, stock tickers, etc.). In some embodiments, layout manager 306 is configured to transform the available data according to data personalization preferences of the user, as stored in user preference data 312. For example, layout manager 306 can load the data personalization preferences of the user of headset device 102 during generation of the virtual environment and apply the user's preferences to various elements of the virtual environment (e.g., application window layouts, object placement layouts). A user may prefer a specific window size, text font type or size, object size, object distance, and so forth. Layout manager 306 can capture these preferences from user preference data 312 and provide the preferences to virtual environment generation module 310 during generation of the virtual environment.

Interaction manager 308 is configured to translate input data received from the user of the headset device 102 and transmit the input data to virtual environment generation module 310. In some embodiments, interaction manager 308 uses one or more sensors on headset device 102 to capture a variety of inputs from the user, including but not limited to: gaze/head orientation, hand gestures, biometrics, controller/joystick movement, and button presses. Interaction manager 308 can refer to the user preference data 312 for translation of input data—e.g., a user may prefer to execute a specific action or provide a defined input signal based upon a certain type of gesture, and that correspondence is defined in the user preference data 312. Interaction manager 308 can analyze the user preference data to determine how to translate a user input into a corresponding action to provide to module 310.

Virtual environment generation module 310 is configured to generate a user-specific virtual experience comprised of virtual environment features, experience features, and virtual objects displayed in headset device 102. Module 310 can adapt one or more features of a surrounding physical environment and physical objects, evaluating and applying rules associated with those physical objects and spaces (such as spatial dimensions and physical properties of objects), generate immersive 3D environments and objects based upon the physical features and rules, integrate virtual assets, data, and visual elements into the 3D environment, and customize the virtual experience based upon user data preferences and interaction preferences. Generally, virtual environment generation module 310 enables virtual environments to not only be manipulated (as prescribed by user input signals captured from interaction manager 308), but also provides for transformation of many aspects of the virtual objects (e.g., size, appearance, distance, behavior, interactivity) included in the virtual environment based on the dimensions of physical space available, the properties of the virtual objects, physics-based rules applied to the virtual environment and objects, and in some cases, the properties of the physical objects as well.

Virtual environment generation module 310 can receive the spatial dimensions (and/or vector-based 3D model(s)) of the physical space and physical features of objects in the physical space as input from physical space modeling module 108*a*. Module 310 can further receive tracking data from movement tracking module 108*c* relating to the x-y-z coordinate position, orientation, pose, movement speed, and movement direction for the headset device 102 and/or one or more physical objects in the physical environment. Module 310 can further receive data from alert generation module 108*d* corresponding to alerts intended for display to the user via headset device 102. Virtual environment generation module 310 can dynamically combine the data as part of the generation of the virtual environment and virtual objects, to create a user-specific virtual experience displayed to the user via headset device 102. Module 310 can continually update and adapt the virtual environment and objects based upon, e.g., interactions of the user with the physical environment, interactions of the user with the virtual environment, the specific virtual application selected by the user, changes to the incoming data elements (e.g., modifications to the physics profile, updates to the user preferences, reconfiguration of the physical environment), so that the virtual experience is adapted to, and in some cases, synchronized with the user's physical surroundings. In some embodiments, virtual experience generation module 108*b* is configured to factor in available physical space, physical objects detected, and user interaction preferences to transform the virtual environment and corresponding objects into an appropriate size, appearance, and distance, and enabled with physics-based behavior as applied through the physics profile generated by physics engine 304).

At step 206, virtual experience generation module 108*b* configures one or more user interaction elements in the virtual environment based upon one or more of user behavior, user preferences, and features of the virtual environment. In some embodiments, the user may select a specific type of application with which they want to interact. For example, a plurality of different software applications may be installed on headset device 102 and the user can interact with a menu to select one of the software applications to launch. Virtual experience generation module 108*b* can determine one or more features of the software application (e.g., objects, user interface elements) to be integrated into the virtual environment. Module 108*b* can also determine whether the user preference data 312 has information relating to the selected software application—e.g., the user may prefer that the selected application is visually arranged in a certain way or that the application uses a certain color scheme or text font, etc. Module 108*b* can further determine whether the user has configured the software application to identify or be responsive to certain user behavior—e.g., if the user makes a specific gesture or fixes their gaze on an object for a given amount of time, module 108*b* can associate that behavior with a particular function or action of the software application, such as opening a menu, viewing an alert, executing a transaction, and so forth.

In some embodiments, configuring one or more user interaction elements in the virtual environment can include altering a visual appearance and/or a physical behavior of one or more virtual objects in the virtual environment based upon user behavior, user preferences, and features of the virtual environment. As just one example, the virtual environment generated for the selected software application may include a plurality of objects that can be manipulated by the user while interacting with the virtual environment. The user preference data can indicate that the user prefers objects of this type to have certain visual or behavioral features when using the selected software application, but not when using a different software application. Module 108*b* can modify a baseline or template object to conform to the information contained in the user preference data 312 when generating the virtual environment.

At step 208, once virtual experience generation module 108*b* has generated the virtual environment and configured the user interaction elements as described above, module 108*b* causes the headset device 102 to render the virtual environment for display to the user. In some embodiments, module 108*b* can provide data to headset device 102 that is necessary to visually render the virtual environment, and one or more components of headset device 102 (e.g., CPU, GPU, memory, display) can perform local, device-based rendering of the virtual environment. In some embodiments, module 108*b* can render all or a portion of the virtual environment in server computing device 106 and transmit the rendered virtual environment to headset device 102 for display. Once the virtual environment is rendered, the user of headset device 102 can interact with the environment and/or virtual objects in the environment as described herein.

While the user is interacting with the virtual environment, one or more alerts intended for the user may be detected by server computing device 106. At step 210, alert generation module 108*d* detects an alert message intended for the user. For example, alert generation module 108*d* can receive an incoming alert message from a remote computing device via network 104. The alert message can include indicia (e.g., username, account number) that identifies the user of headset device 102, along with an alert data type and the alert message content to be displayed to the user. Alert generation module 108*d* receives the alert message and determines that the alert message should be displayed to the user of headset device 102. Alert generation module 108*d* can transmit the content of the alert message to virtual experience generation module 108*b* for creation and display of the alert message to the user of headset device 102 as described herein.

At step 212, virtual experience generation module 108*b* transforms the alert message for display in the virtual environment based upon the user behavior, the user preferences, and the features of the virtual environment-thereby enabling alert messages to be presented in the virtual environment in a way that focuses the user's attention on the alert message. In some embodiments, module 108*b* transforms the alert message content received from alert generation module 108*d* based on how the user prefers alert data (and/or data in general) to be sequenced. For example, a user may prefer that data is arranged visually in a certain structure (e.g., domino structure, tree structure, etc.) and/or that alert data of different types is arranged in different ways depending upon the alert type. Layout manager 306 can configure the visual layout and arrangement of the alert message to conform to the user's preferences. As one example, a user that prefers to view individual alert items as they arrive may have those data elements presented at one or more upper corners of their field of view. In another example, a user that prefers gesture control might want their alerts collected in a small tray towards the bottom of their field of view (e.g., with a count of unread alerts) where they can easily gesture to expand and view the alerts, swipe them aside, etc.

At step 214, visual experience generation module 108*b* causes the headset device 102 to display the transformed alert message in the virtual environment in a way that focuses the user's attention on the transformed alert message. As mentioned above, a user may prefer that all alerts are displayed in a certain way in the virtual environment. In some embodiments, a user may prefer that certain alert types are rendered in different ways to ensure that appropriate attention is given to the alert message. For example, the user may prefer that high-priority alert messages (e.g., Amber Alert or breaking news alert) are displayed in the virtual environment directly in the user's current line of sight and in a way that occludes the user's view of other objects or features in the virtual environment. In another example, the user may prefer that low-priority alert messages (e.g., transaction confirmations) are displayed in the virtual environment in a corner of the user's field of view in a semi-transparent UI element so the user's view of the objects and features in the virtual environment is not significantly impacted. In yet another example, the user may prefer that certain types of alert messages are not displayed during their interaction with a specific software application or virtual environment. Instead, these alert messages can be stored and selectively viewed by the user at a different time.

Figure 4:
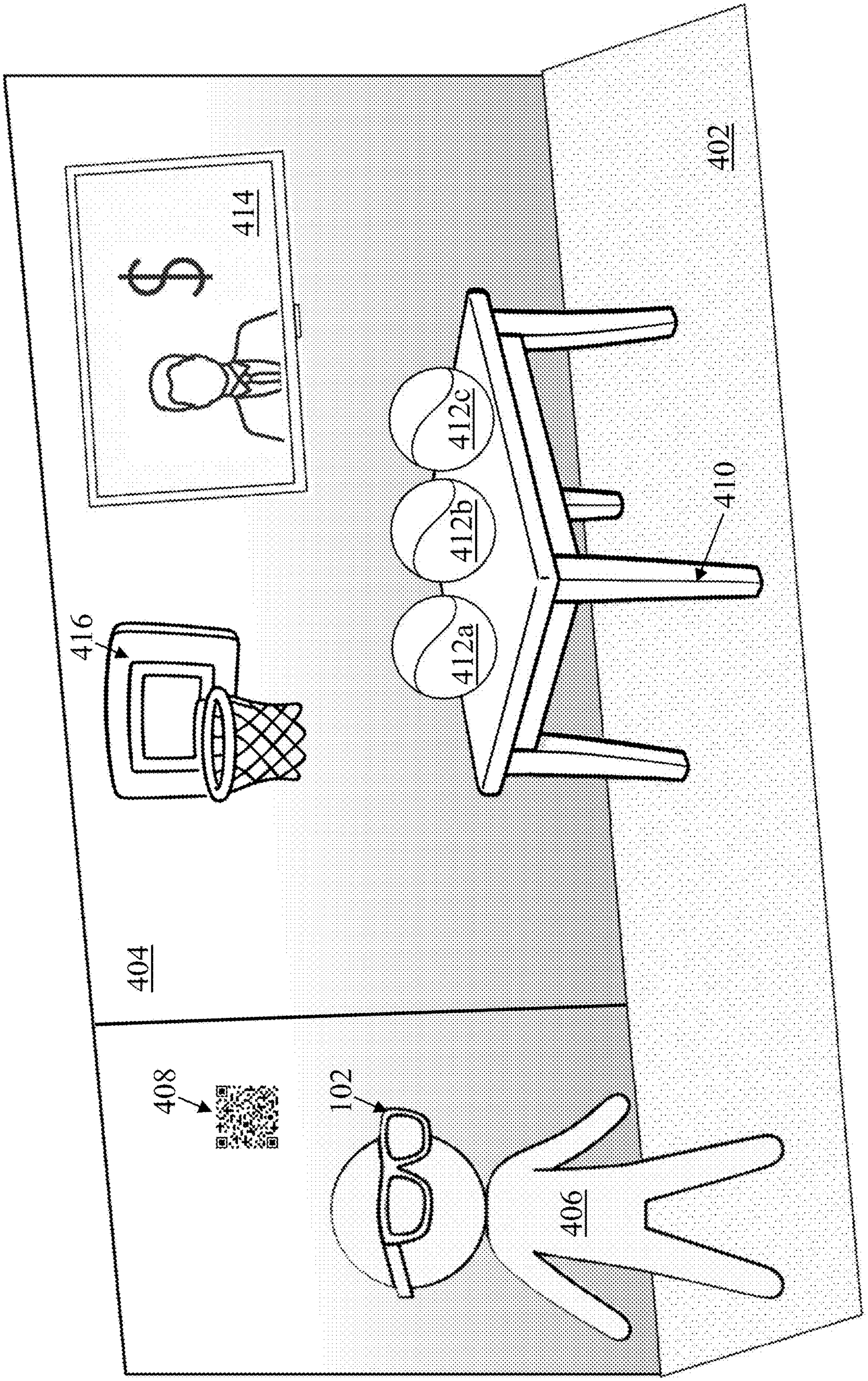
FIG. 4 is a diagram of an exemplary physical environment to illustrate operation of the methods and systems described herein.

The following paragraphs describe an exemplary use case for application of the systems and methods described herein. FIG. 4 is a diagram of an exemplary physical environment to illustrate operation of the methods and systems described above with respect to FIGS. 1-3. As shown in FIG. 4, for ease of illustration the physical environment is depicted as a cutaway view of a room, with floor 402 and wall 404. The user 406 wearing headset device 102 is positioned at one side of the room. The room includes a QR code 408 that identifies the room (affixed to wall 404), a physical table 410 in the center of the room, a plurality of physical objects 412*a*-412*c* (in this case, foam basketballs) positioned on top of the table 410, a display screen 414 (e.g., monitor, television) and a physical basketball hoop 416 hanging on the wall 404 at the far side of the room. In this example, the display screen 414 is showing a financial news broadcast.

As mentioned previously, when the user puts on the headset device 102, the user may be asked to log in to the device by, e.g., providing authentication credentials (e.g., username/password, PIN, etc.) via a user interface displayed in headset device 102. In some embodiments, after receiving the authentication credentials, headset device 102 can connect to server computing device 106 and/or one or more other remote computing devices to authenticate the user and retrieve information associated with the user (e.g., user identity, user profile, user experience preferences, user alert preferences, account information, etc.). In some embodiments, headset device 102 can store the authentication credentials and/or user information in local memory.

Headset device 102 establishes a connection to server computing device 106 and provides the user's authentication credentials and/or identifying information to server computing device. Headset device 102 also provides identifying information associated with the headset device to the server when establishing the connection. For example, headset device 102 can transmit a device ID, serial number, or other indicia that uniquely identifies the headset device. Upon receiving the identifying information, server computing device 106 can identify the headset device 102 using the identifying information. In some embodiments, server computing device 106 searches database 110 using the identifying information to retrieve additional information associated with the headset device 102—including, but not limited to, device manufacturer/model/version (e.g., Apple Vision Pro), device hardware attributes (e.g., CPU, memory, GPU), installed application software, and so forth.

In some embodiments, server computing device 106 also generates a record in database 110 that maps the identifying information of headset device 102 to user-identifying information associated with the user that is currently wearing the headset device. For example, server computing device 106 can generate a record that indicates a specific headset device is currently being worn by a specific user, and the record can also include other metadata such as start time (e.g., when the user started wearing the device).

In some embodiments, the user of headset device 102 can select a specific virtual environment application that they want to user during this session. In this use case, the user selects a stock research and trading platform software application. This application enables the user to explore a variety of data relating to both general stock market activity (e.g., the current day's market performance, stock prices, trading volumes, etc.) as well as the user's specific portfolio performance. This application also enables the user to execute stock trades from their brokerage account via the virtual environment, as will be described in greater detail below.

Upon activating the headset device 102, selecting a software application, and entering the room, the user can scan the QR code 408 using headset device 102, which transmits the scanned QR code to physical space modeling module 108*a* of server computing device 106. Physical space modeling module 108*a* identifies the room using the QR code and retrieves stored physical environment features (e.g., spatial dimensions) for the identified room from database 110. As mentioned previously, in some embodiments, module 108*a* can also retrieve physical object features and spatial dimensions for table 410, basketballs 412*a*-412*c*, display screen 414, and/or hoop 416 based upon the QR code. Module 108*a* can also detect physical features of the room, table 410, basketballs 412*a*-412*c*, display screen 414, and/or hoop 416 based upon, e.g., a real-time scan of the relevant physical environment or objects as performed by headset device 102. Physical space modeling module 108*a* generates spatial dimension data for the room and the objects 410, 412*a*-412*c*, 414, and 416 (comprising dimensional data and/or vector-based 3D model data) and transmits the spatial dimension data to virtual experience generation module 108*b*.

Figure 5:
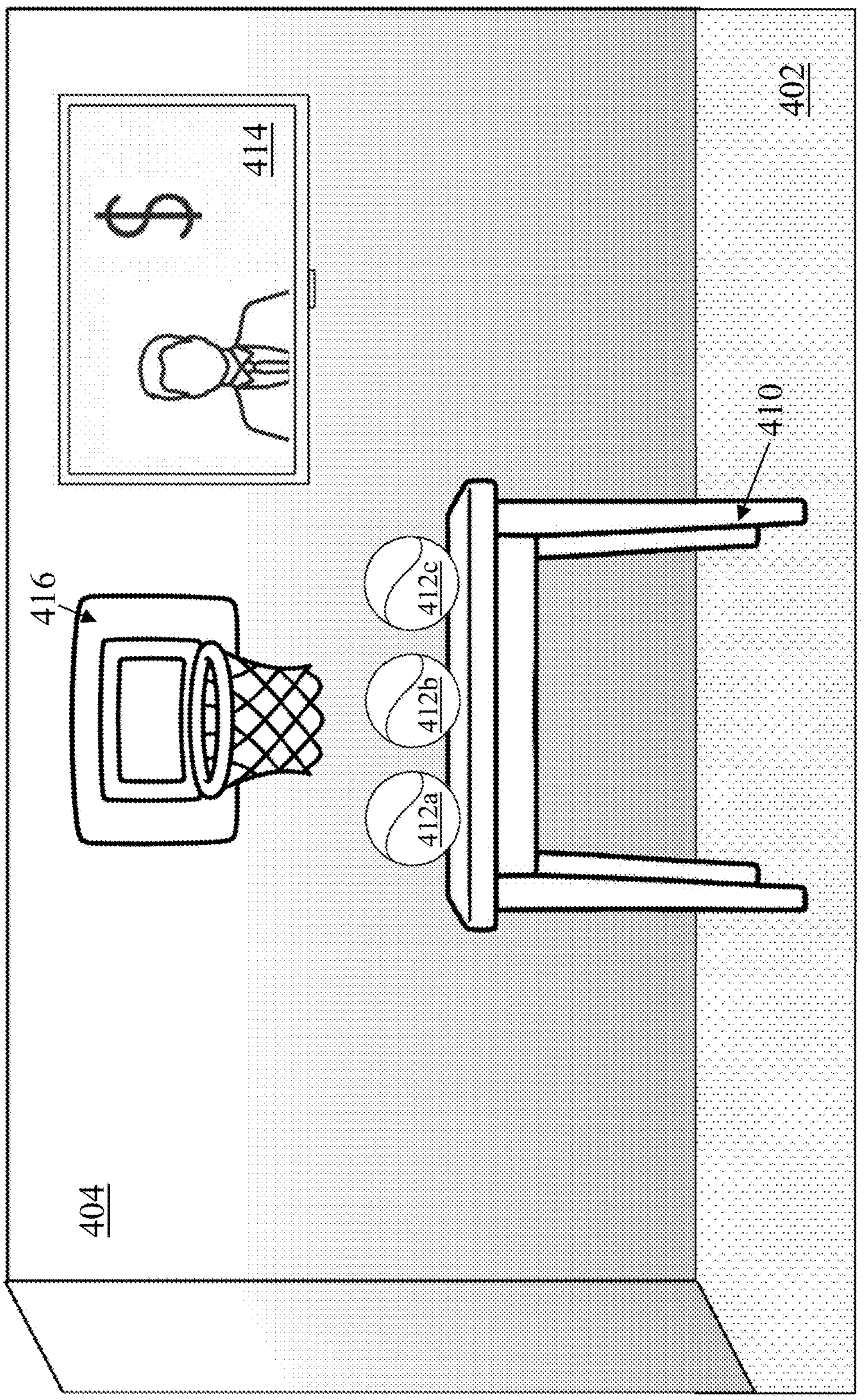
FIG. 5 is a diagram of the exemplary physical environment of FIG. 4, as seen from the perspective of the user.

FIG. 5 is a diagram of the exemplary physical environment of FIG. 4, as seen from the perspective of the user 406. As shown in FIG. 5, the user has a direct view of table 410, foam basketballs 412*a*-412*c*, display screen 414, and hoop 416. At this point, headset device 102 has not yet begun displaying a virtual environment to the user 406 of headset device 102.

Virtual experience generation module 108*b* receives the physical environment feature data and physical object feature data from physical space modeling module 108*a*. Module 108*b* generates a virtual environment associated with the selected stock trading application that includes one or more virtual objects based upon an identity of a user of the headset device, the physical environment features, and the physical object features, including adapting the virtual environment to conform to one or more constraints of the physical environment. In this use case, virtual environment generation module 310 captures a user identity (e.g., username, account number) from database 110 and retrieves brokerage account-related information such as the user's account balance, positions held, and asset allocation from, e.g., a remote data source. Module 310 coordinates with UI module 302 and layout manager 306 to generate a virtual user interface for display in headset device 102, as part of the stock trading software application, which incorporates the user's brokerage account information.

Figure 6:
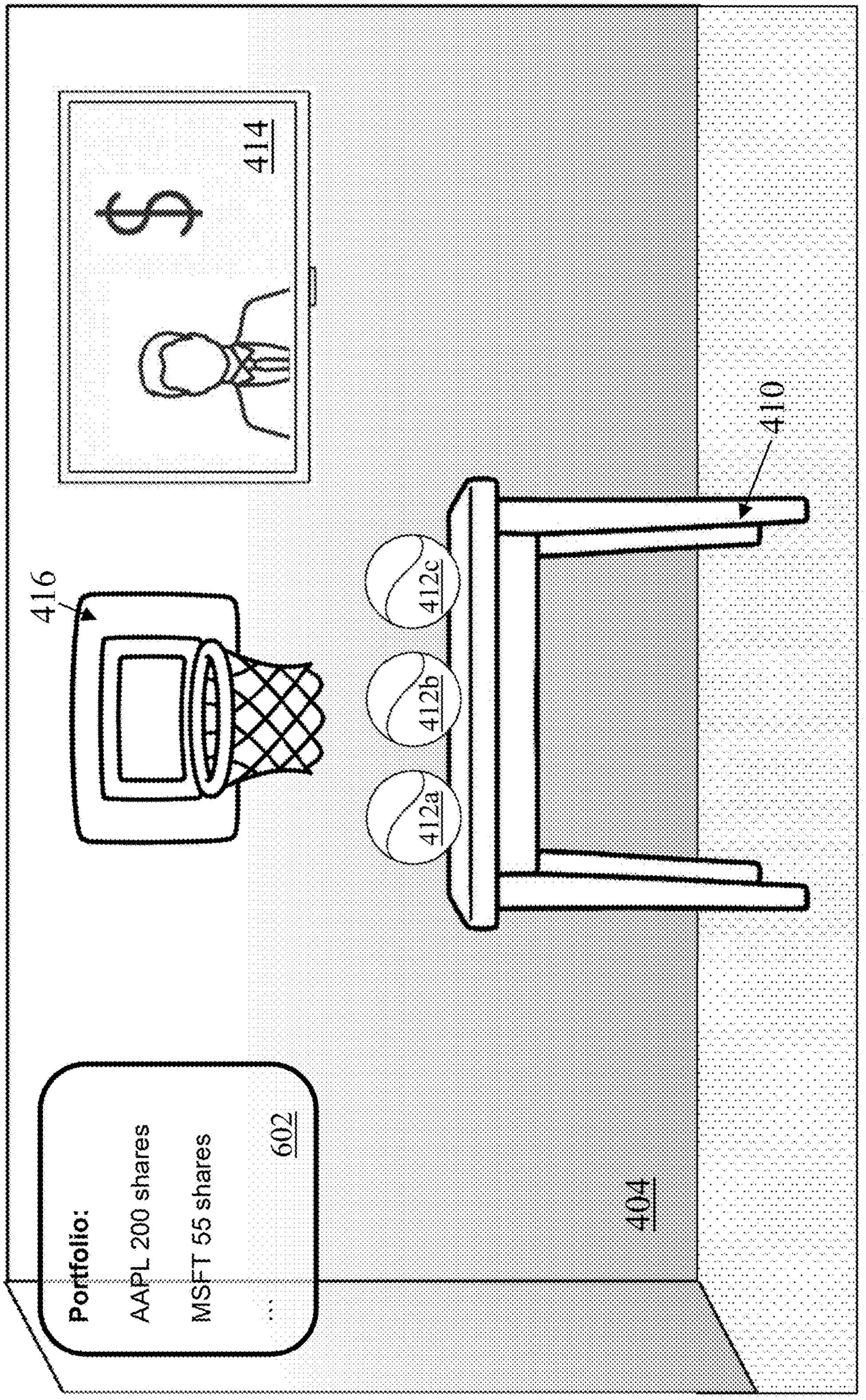
FIG. 6 is a diagram of an exemplary virtual environment generated by a virtual experience generation module.

FIG. 6 is a diagram of an exemplary virtual environment generated by virtual experience generation module 108*b*, including data based upon the user's brokerage account information. As shown in FIG. 6, module 108*b* has generated a semi-transparent user interface widget 602 that contains real-time stock prices for securities in the user's portfolio. The widget 602 is positioned in one corner of the virtual environment, such that the user can still have an unobstructed view of table 410, basketballs 412*a*-412*c*, display screen 414, and hoop 416. In some embodiments, the user 406 of headset device 102 can interact with widget 602 (e.g., by gesturing, tapping, clicking) to expand the widget 602 and view more detailed information, or to minimize or remove the widget 602.

Figure 7:
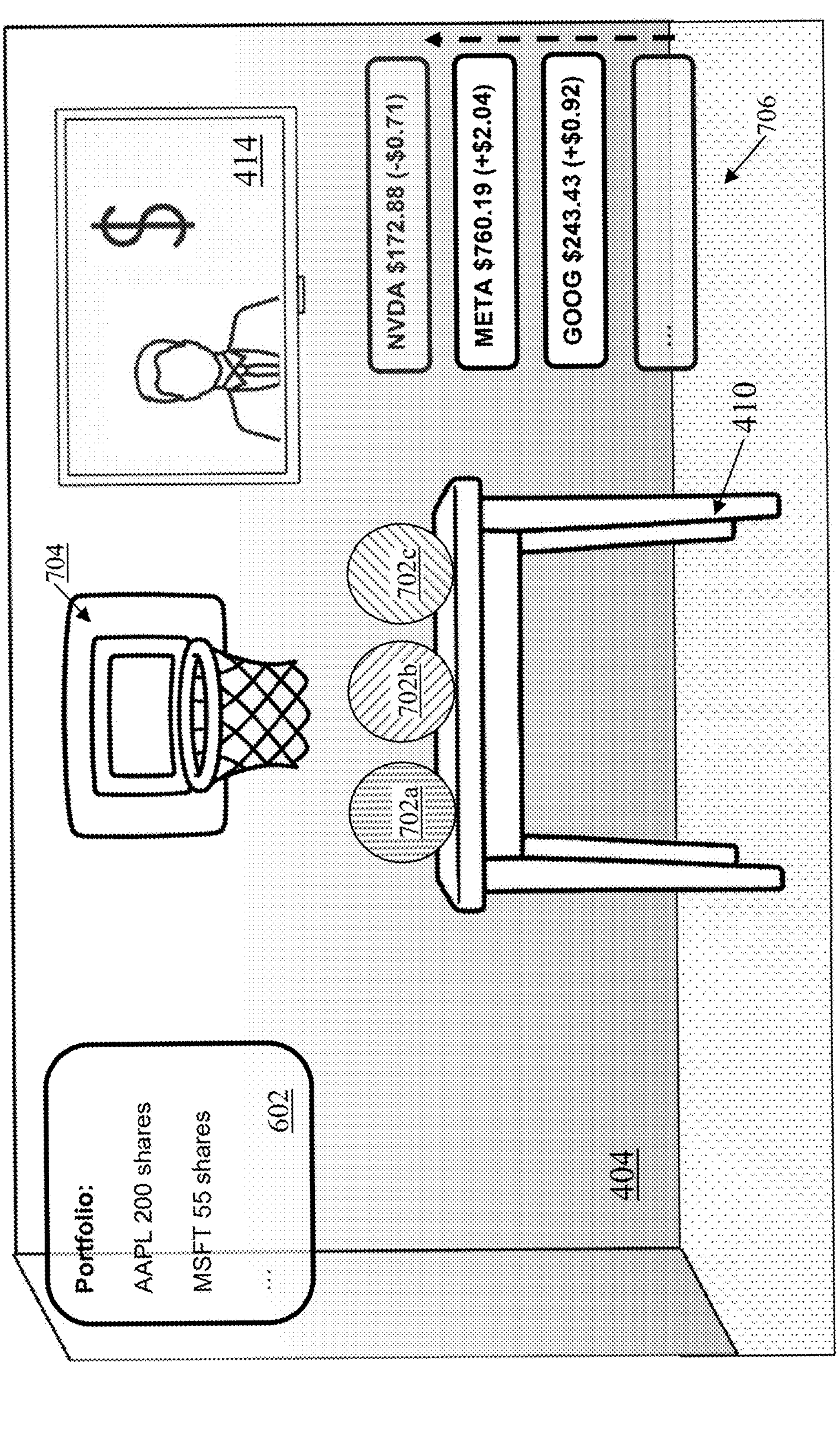
FIG. 7 is a diagram of an exemplary virtual environment generated by a virtual experience generation module, including one or more virtual objects that correspond to objects in the room.

Virtual experience generation module 108*b* continues generating the virtual environment for display to the user 406 by generating a plurality of virtual objects based upon the physical environment feature data and the physical object feature data. In this example, at least some of the virtual objects correspond to physical objects in the physical environment. FIG. 7 is a diagram of the exemplary virtual environment generated by virtual experience generation module 108*b*, including one or more virtual objects 702*a*-702*c* and 704 that correspond to the objects 412*a*-412*c* and 416 in the room. As shown in FIG. 7, module 108*b* has generated three virtual basketballs 702*a*-702*c* and a virtual hoop 704 for display to the user 406 of headset device 102. In this example, the virtual basketballs 702*a*-702*c* and hoop 704 are positioned in the user's field of view and directly overlaid on top of the corresponding physical objects 412*a*-412*c* and 416. Although in this example each of the virtual objects 702*a*-702*c* and 704 occludes the user's view of the physical objects 412*a*-412*c* and 416, in some embodiments, the virtual objects 702*a*-702*c* and 704 can be semi-transparent or transparent, allowing the user 406 to see the physical objects as well as the virtual objects. In some embodiments, module 108*b* can generate the hoop 704 so that it appears to the user 406 to be hanging on the wall next to display screen 414 and/or floating in air behind the table. Physics engine 304 applies one or more physics profiles to the virtual basketballs 702*a*-702*c* so that they behave like physical basketballs, i.e., the user can pick them up, dribble them, and shoot them at the hoop 704 in a manner that is similar to the real world objects.

In addition, module 108*b* has generated a list of alert messages 706 that relate to stock price activity for certain securities (e.g., currently owned by the user and/or not owned by the user). The list of alert messages 706 is positioned in the lower right portion of the user's field of view, below the display screen 414. As shown in FIG. 7, individual alert messages first appear at the bottom of list 706 with a semi-transparent visual and move upward (as indicated by the dashed arrow), becoming less transparent until they reach the center of the list. Similarly, as alert messages reach the top of list 706, they become more transparent and eventually disappear. As mentioned above, layout manager 306 is configured to control the appearance and movement of these alert messages based upon, e.g., user preferences and physical environment features.

Virtual experience generation module 108*b* continues by configuring one or more user interaction elements in the virtual environment based upon one or more of user behavior, user preferences, and features of the virtual environment. In this example, interaction manager 308 configures the virtual basketballs 702*a*-702*c* and the hoop 704 to perform certain application functions when the user interacts with them. For example, interaction manager 308 can configure each of the basketballs 702*a*-702*c* to be 'picked up' in the virtual environment when the user picks up a physical basketball 412*a*-412*c*, or when the user virtually gestures toward them, grasps them, or otherwise interacts with the virtual objects. In another example, interaction manager 308 can configure the hoop 704 to initiate the execution of a transaction (e.g., stock trade) when the user shoots one of the physical basketballs 412*a*-412*c* through the physical hoop 416 and/or shoots one of the virtual basketballs 702*a* through the virtual hoop 704—as will be explained in greater detail below. After generation and configuration of the virtual environment, virtual experience generation module 108*b* causes the headset device 102 to render the virtual environment for display to the user 406—an example of which is shown in FIG. 7.

Figure 8:
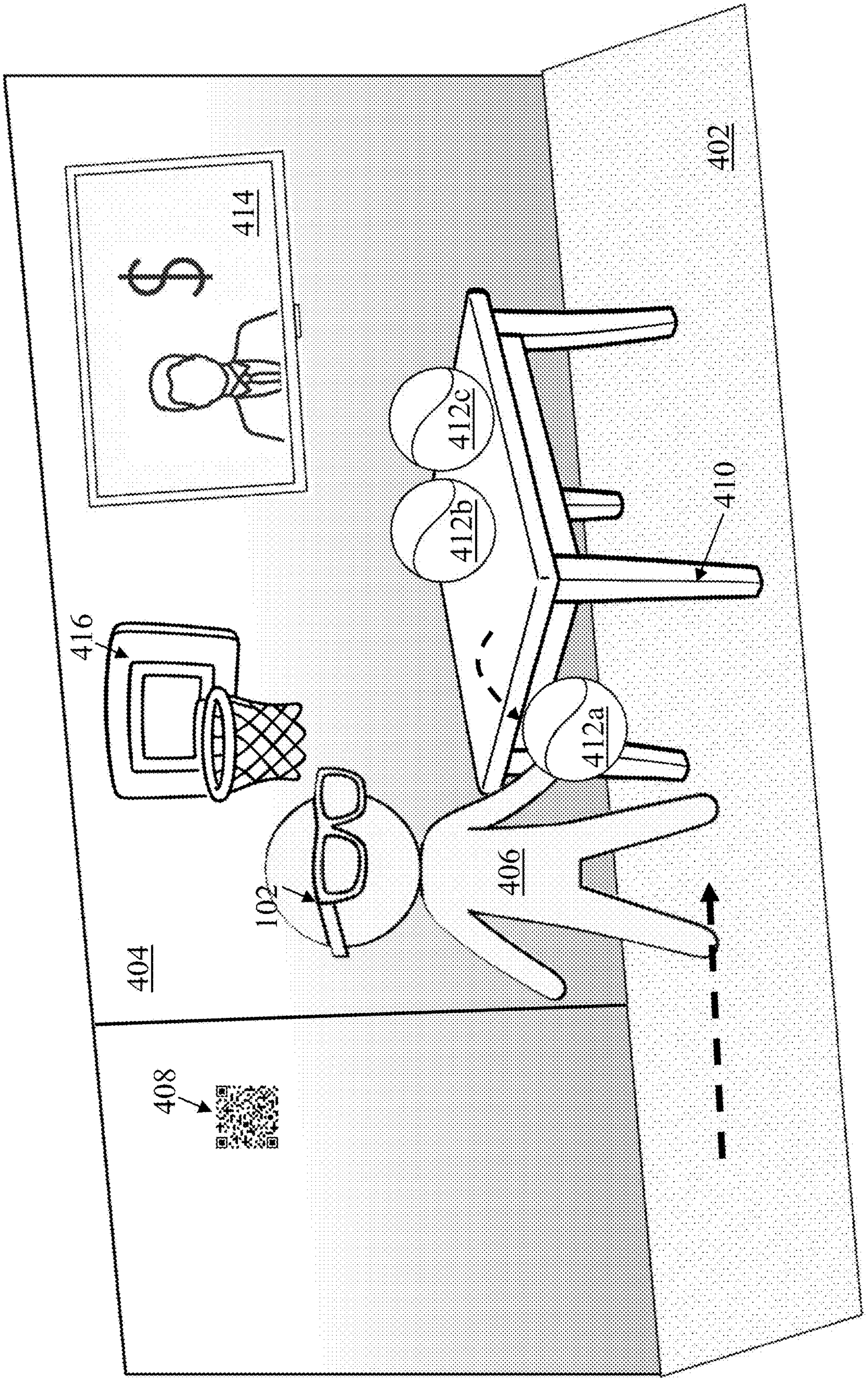
FIG. 8 is a diagram of the exemplary physical environment of FIG. 4, showing a user moving and picking up an object.

The user 406 can interact with the physical environment and/or the virtual environment as part of their use of the stock trading software application. In this use case, the user 406 moves from the side of the room and stands next to table 410, then picks up one of the foam basketballs 412*a*. FIG. 8 is a diagram of the exemplary physical environment of FIG. 4, showing the user moving toward table 410 and picking up basketball 412*a*.

Figure 9:
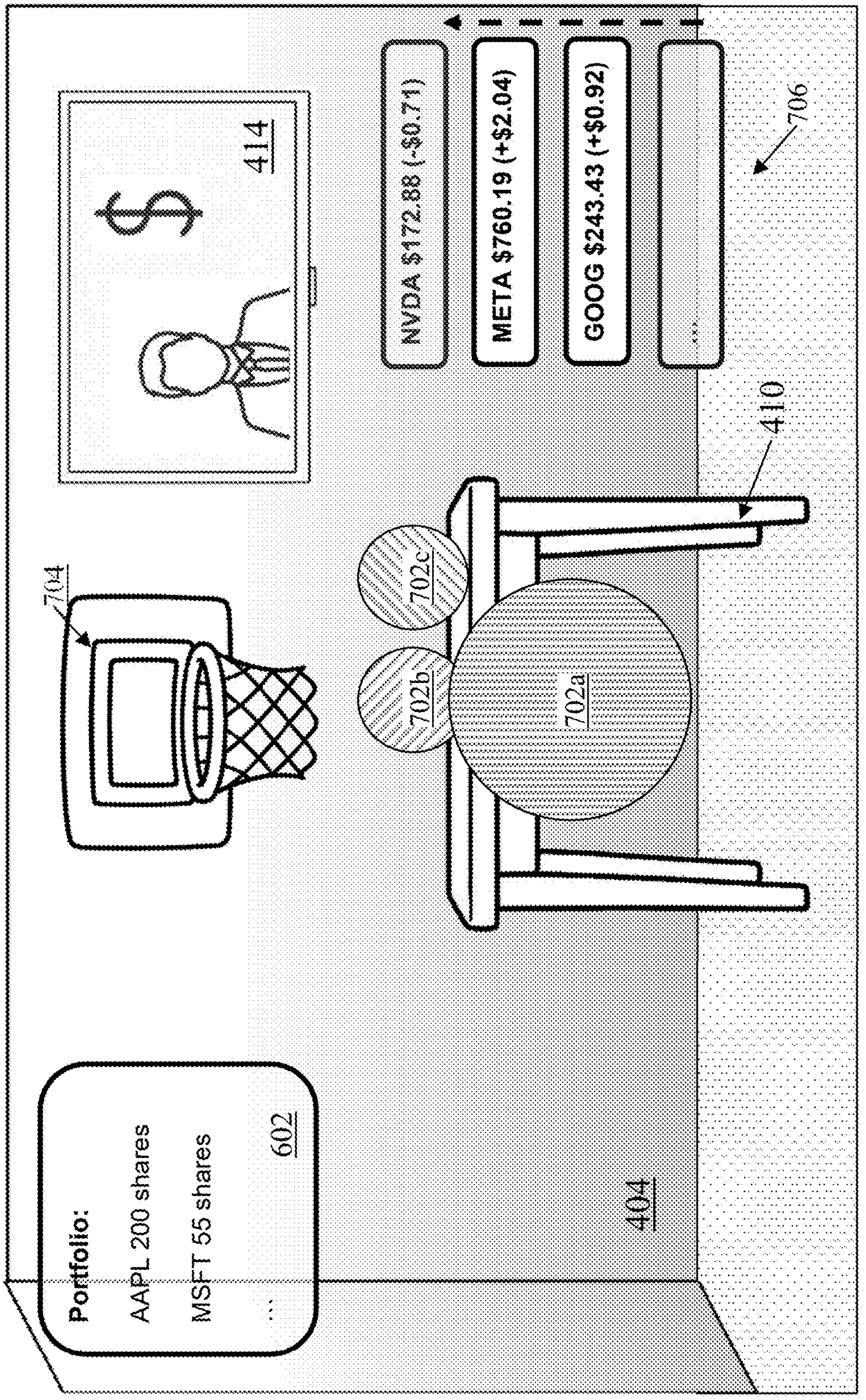
FIG. 9 is a diagram of an exemplary virtual environment generated by a virtual experience generation module, showing a virtual object having moved in response to a user action.

Based upon the user's movement and interaction with object 412*a*, virtual experience generation module 108*b* of server computing device 106 adapts the virtual environment to conform to the user's movements. FIG. 9 is a diagram of the exemplary virtual environment generated by virtual experience generation module 108*b*, showing the virtual object 702*a* corresponding to the basketball 412*a* having moved closer to the user 406 in response to the user grabbing the basketball 412*a* from table 410. In some embodiments, the user 406 does not need to physically pick up the basketball 412*a* in order to interact with the virtual basketball 702*a*. Instead, the user can 'grab' the virtual basketball 702*a*—and the physical basketball 412*a* would remain resting on the surface of table 410.

During the user's interaction with the virtual environment, alert generation module 108*d* detects an alert message intended for the user 406. For example, the alert message may indicate that one of the companies whose stock is held by the user 406 (e.g., NFLX) just beat their Q4 earnings estimates by a large amount—which could lead to an increase in the stock price. Alert generation module 108*d* transmits the alert to virtual experience generation module 108*b*, where modules 306 and 310 coordinate to transform the alert message for display in the virtual environment. In this case, the user may have configured their preferences to enable modules 306 and 310 to display this type of alert prominently in the virtual environment, so that the user can quickly become aware of the alert and take actions in response to the alert.

Figure 10:
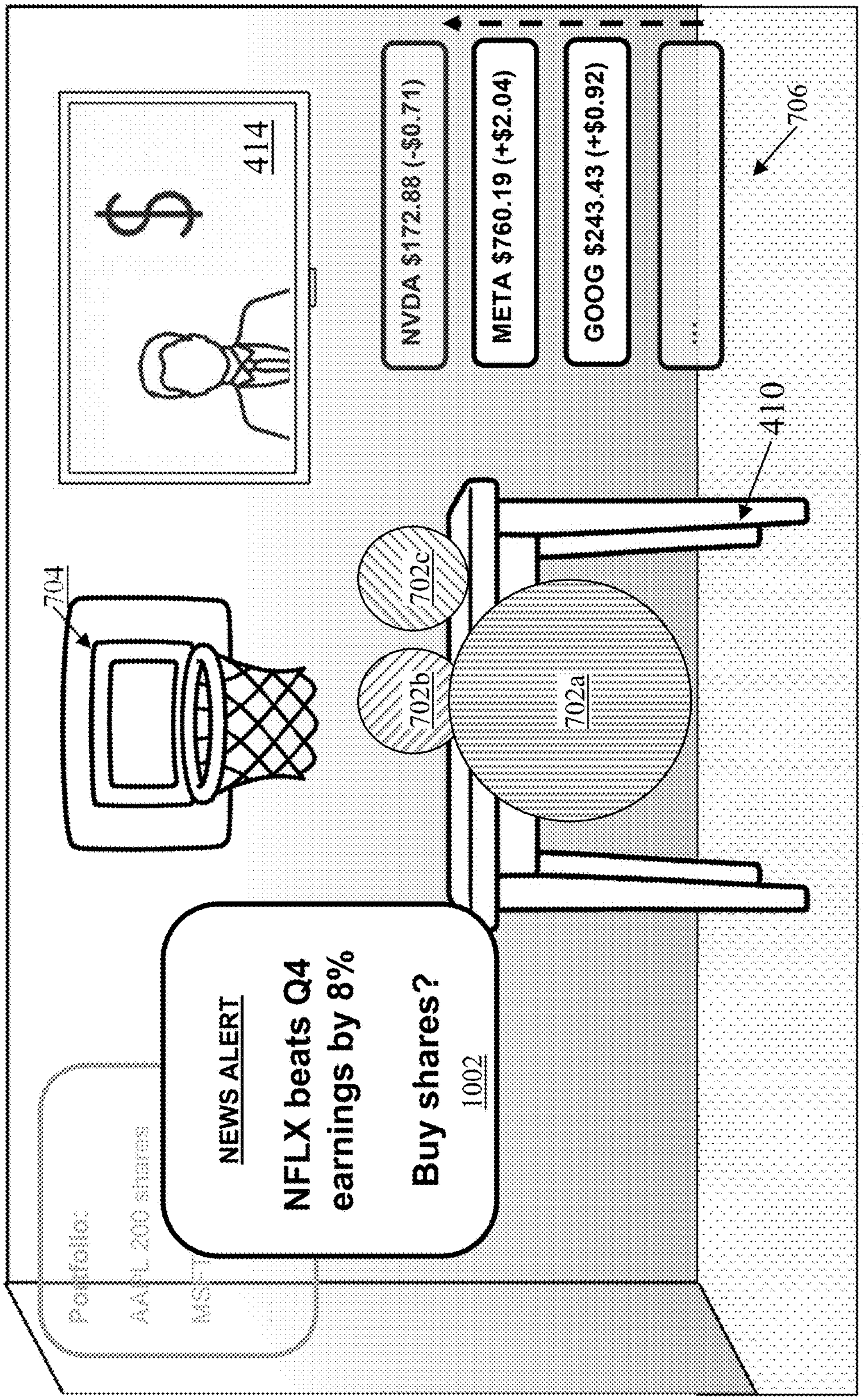
FIG. 10 is a diagram of an exemplary virtual environment generated by a virtual experience generation module, showing a transformed alert message being displayed to a user.

FIG. 10 is a diagram of the exemplary virtual environment generated by virtual experience generation module 108*b*, showing the transformed alert message being displayed to the user 406. As shown in FIG. 10, the alert message 1002 for the NFLX earnings news is displayed directly in the user's field of view. In some embodiments, the alert message 1002 can comprise other visual elements—such as flashing text, different colors, etc.—and/or accompanied by other sensory elements—such as a sound played to the user when the alert appears. The alert message 1002 provides the news to the user 406 along with a transaction recommendation (e.g., "Buy shares?"). In order to act on the alert, the user can shoot the physical basketball 412*a* (or the virtual basketball 702*a*) toward the hoop 704 displayed in the virtual environment.

In this use case, when the alert message 1002 is being displayed in the virtual environment, interaction manager 306 and virtual environment generation module 310 can adapt the visual and/or physical properties of the virtual objects 702*a*-702*c* based upon the type and/or content of the alert message 1002. In some embodiments, interaction manager 306 detects that the alert message 1002 is a buy recommendation type—meaning that the alert is recommending to the user that they buy shares of the stock identified in the alert message. Interaction manager 306 and virtual environment generation module 310 modifies the appearance of the virtual basketballs 702*a*-702*c* based on the buy recommendation alert type.

Figure 11:
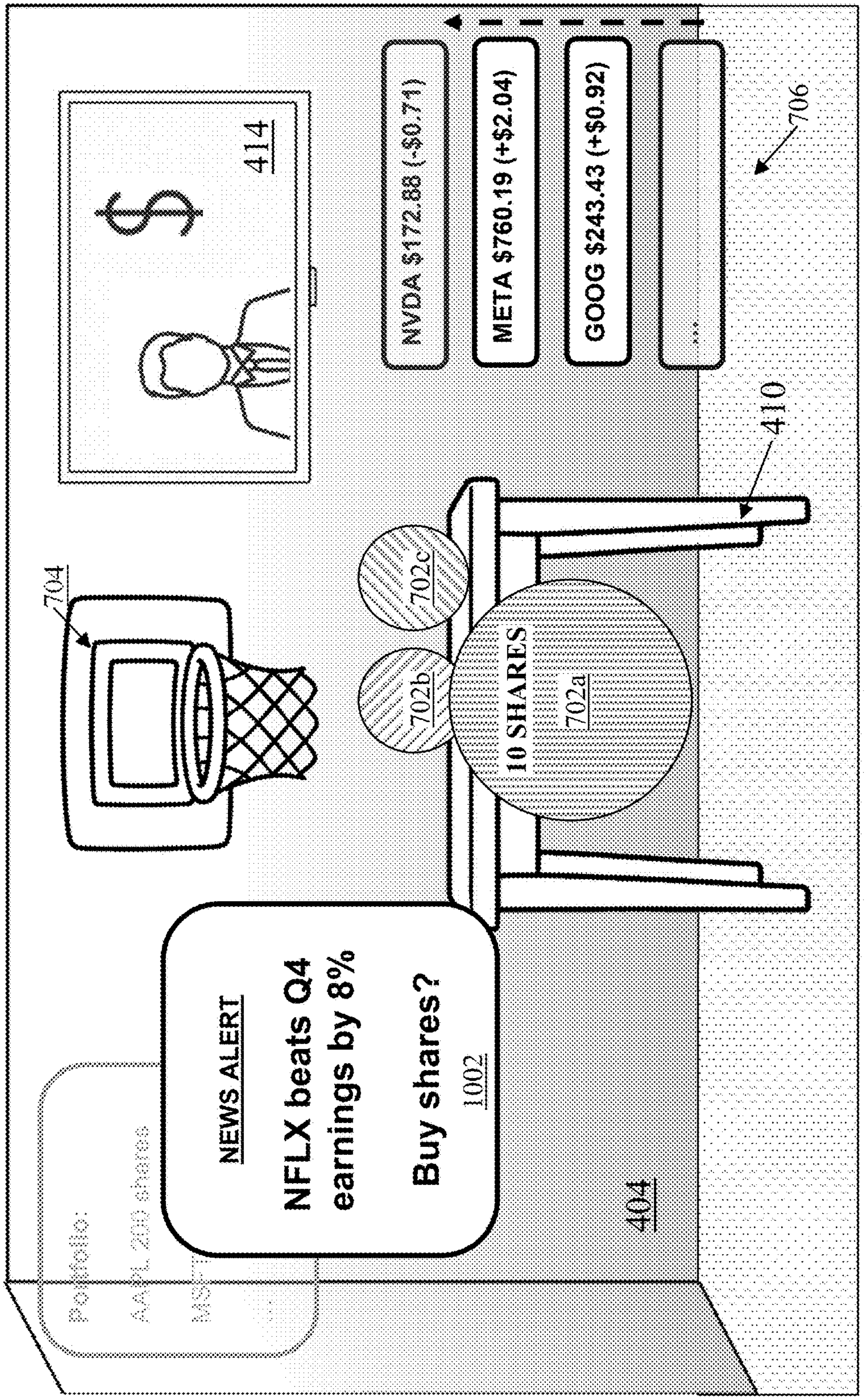
FIG. 11 is a diagram of an exemplary virtual environment generated by a virtual experience generation module, showing a modified appearance of virtual objects.

FIG. 11 is a diagram of the exemplary virtual environment generated by virtual experience generation module 108*b*, showing the modified appearance of the virtual basketballs 702*a*-702*c*. As shown in FIG. 11, virtual basketball 702*a* (i.e., the ball that the user is holding) now has a text message ("10 SHARES") displayed on its surface. In this example, virtual basketballs 702*b* and 702*c* can each have a different text message (e.g., "20 SHARES" and "30 SHARES," respectively) displayed on their respective surfaces. Depending upon how many shares the user wants to purchase, the user can pick up the corresponding physical basketball 412*a*-412*c* or virtual basketball 702*a*-702*c*. In this case, the user has decided to purchase 10 shares—so they maintain control of the physical basketball 412*a*/virtual basketball 702*a*.

Figure 12:
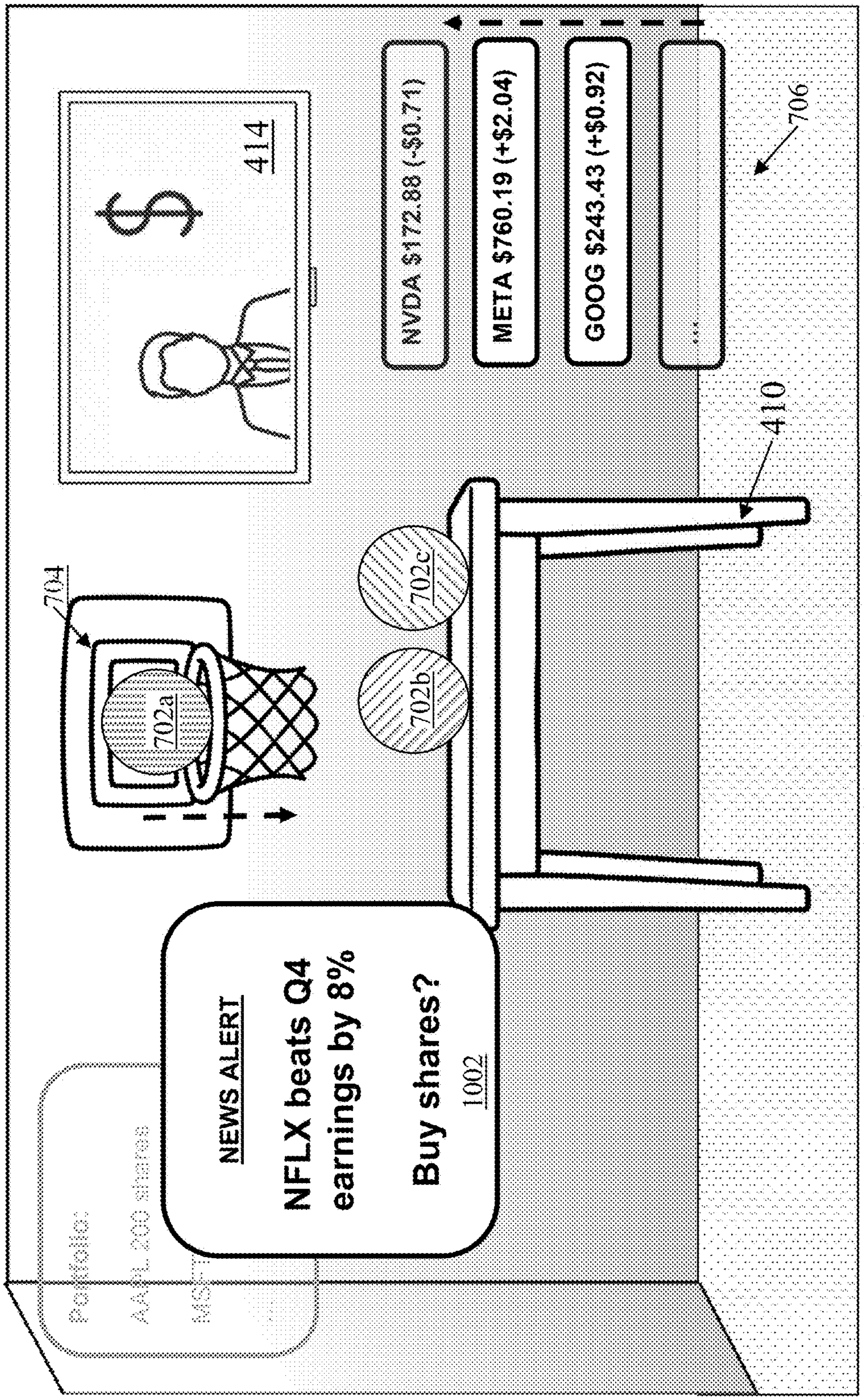
FIG. 12 is a diagram of an exemplary virtual environment generated by a virtual experience generation module, showing a virtual object initiating a transaction.

To execute the buy transaction, the user can shoot the physical basketball 412*a*/virtual basketball 702*a* at the hoop 416/704. In some embodiments, virtual experience generation module 108*b* translates the act of shooting the basketball as indicating that the purchase transaction should executed—regardless of whether the ball actually goes through the hoop. In some embodiments, module 108*b* waits until the basketball successfully goes through the hoop before executing the purchase transaction. FIG. 12 is a diagram of the exemplary virtual environment generated by virtual experience generation module 108*b*, showing the virtual basketball 702*a* going through the hoop 704—thereby initiating the stock purchase transaction in the user's brokerage account. Server computing device 106 can establish a connection to, e.g., a downstream trading platform via network 104 and provide the transaction information (e.g., user ID, user account number, stock ticker, number of shares, type of transaction) to the trading platform, which executes the trade. Alert generation module 108*d* can receive a transaction confirmation alert from the trading platform for display to the user.

Figure 13:
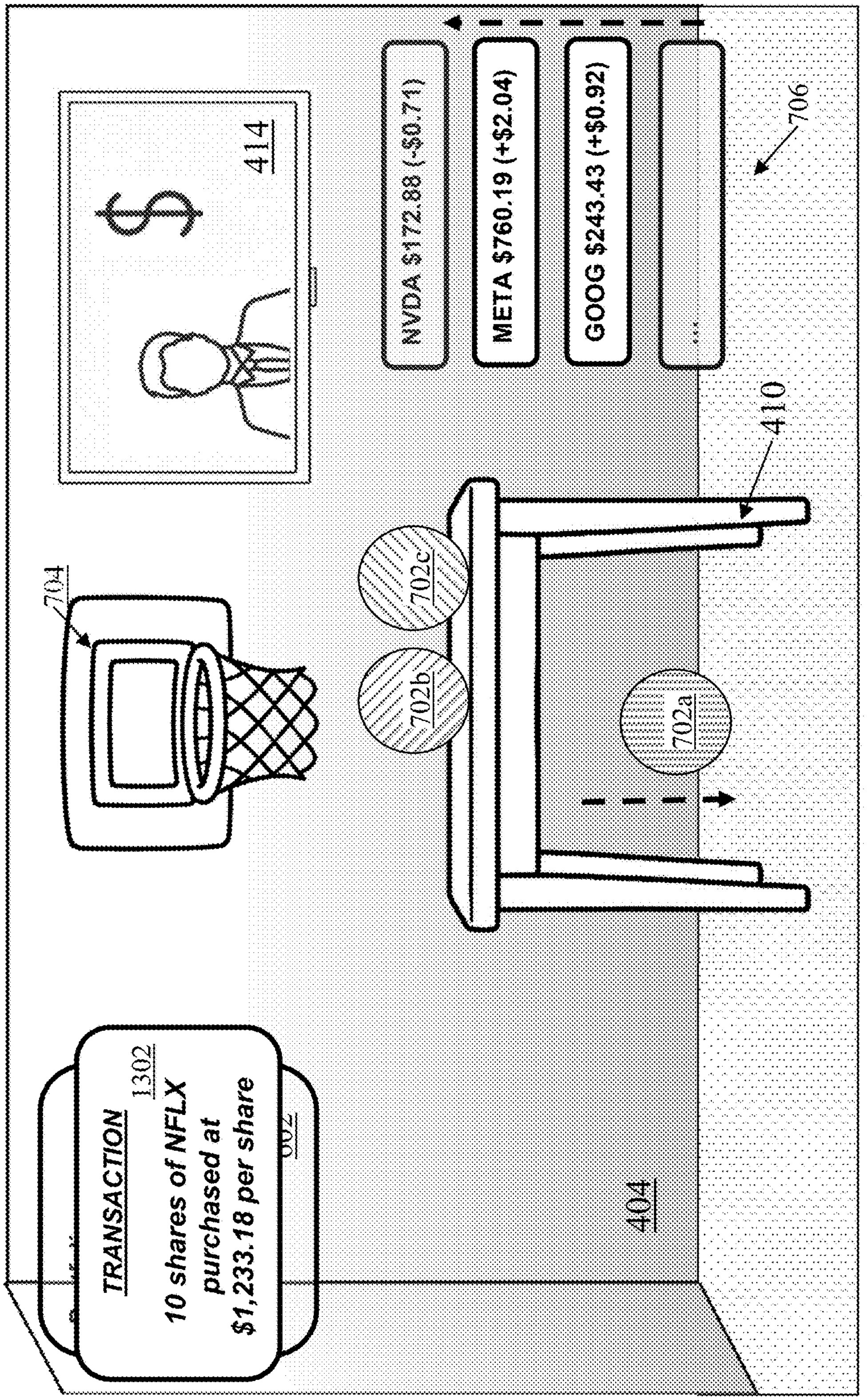
FIG. 13 is a diagram of an exemplary virtual environment generated by a virtual experience generation module, showing a transaction confirmation alert message.

FIG. 13 is a diagram of the exemplary virtual environment generated by virtual experience generation module 108*b*, showing the transaction confirmation alert message 1302 that resulted from the stock purchase transaction. As shown in FIG. 13, the confirmation alert message 1302 is temporarily displayed on top of the portfolio widget 602 in the upper left corner of the field of view. After a predetermined amount of time (e.g., 10 seconds), the confirmation alert message 1302 fades away and eventually disappears from the user's view.

Other use cases for the systems and methods described herein include, but are not limited to:

- Creating a virtual reality trading experience that allows a user to create aspects of a starship bridge (i.e., change their television to be a starship control panel) and show a virtual wall control panel that displays a grid of held stocks. The user can then use a controller (that has an overlay of a laser blaster) and shoot towards a grid of held stocks to trade. Based on the physics profile and user preferences, the beam that shoots out from the blaster could be slow moving through the air, giving the user the opportunity to cancel the trade.
- Leveraging a virtual reality headset device to detect spaces and objects around them, including logos and the brands or type of objects. Then, through virtual objects (or physical objects imbued with a connection to an action), the user could throw an object such as a ball onto an item such as a specific brand of couch, and the virtual environment can display an application window with a pre-populated trade ticket for the company that manufactures and sells the couch.

In summary, the methods and systems described herein advantageously provide a technical solution that generates a customized, dynamic, physics-based virtual experience based upon the user's surrounding physical environment. In these embodiments, virtual assets and artifacts are integrated into a physical space such that the virtual assets are displayed in relation to physical objects visible to a user of a headset device, as the user is inhabiting or traveling within the physical space.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account-which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™ near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for dynamically generating and rendering a virtual reality environment adapted to features and constraints of a surrounding physical environment, the system comprising a server computing device with a memory for storing computer-executable instructions and a processor that executes the computer-executable instructions to:

capture a plurality of features of (i) a physical environment in which a virtual reality headset device is located and (ii) one or more objects in the physical environment;

generate, for display in the virtual reality headset device, a virtual environment that includes one or more virtual objects based upon an identity of a user of the headset device, the physical environment features, and the physical object features, including adapting the virtual environment to conform to one or more constraints of the physical environment;

configure one or more user interaction elements, including one or more of the virtual objects, in the virtual environment based upon one or more of user behavior, user preferences, and features of the virtual environment, wherein a user interaction with the configured user interaction elements is associated with initiating a transaction;

cause the virtual reality headset device to render the virtual environment for display to the user;

detect an alert message intended for the user;

transform the alert message for display in the virtual environment based upon the user behavior, the user preferences, and the features of the virtual environment, including adapting a visual appearance of one or more of the virtual objects in the virtual environment based upon a type of the alert message and content of the alert message by merging one or more user-specific data elements with the content of the alert message into the visual appearance of the one or more virtual objects;

cause the virtual reality headset device to display the transformed alert message in the virtual environment to focus the user's attention on the transformed alert message;

detect a user interaction with one or more of the configured user interaction elements in the virtual environment;

determine a transaction to be initiated based upon one or more features of the user interaction; and initiate the transaction, including causing the virtual reality headset device to display a transaction confirmation message in the virtual environment based upon the user behavior, the user preferences, and the features of the virtual environment.

2. The system of claim 1, wherein capturing features of the physical environment comprises scanning the physical environment using a sensor of the virtual reality headset device to identify spatial dimensions of the physical environment, identifying the physical environment and loading spatial dimensions of the physical environment from a data store, or both.

3. The system of claim 1, wherein capturing features of objects in the physical environment comprises detecting objects in the physical environment and scanning the detected objects using a sensor of the virtual reality headset device to identify physical attributes of the detected objects, identifying objects in the physical environment and loading physical attributes of the detected objects from a data store, or both.

4. The system of claim 3, wherein capturing features of objects in the physical environment comprises tracking movement of the objects in the physical environment.

5. The system of claim 1, wherein the virtual environment generated for display in the virtual reality headset device comprises a vector-based three-dimensional (3D) model.

6. The system of claim 5, wherein adapting the virtual environment to conform to one or more constraints of the physical environment comprises modifying one or more spatial dimensions of the vector-based 3D model to align with corresponding spatial dimensions of the physical environment.

7. The system of claim 1, wherein the user behavior comprises biometric information collected by the virtual reality headset device, gaze information collected by the virtual reality headset device, and gesture information collected by the virtual reality headset device.

8. The system of claim 1, wherein the user preferences comprise data display preferences, object display preferences, and interaction method preferences.

9. The system of claim 1, wherein transforming the alert message for display in the virtual environment comprises:

determining a visual layout for the alert message in the virtual environment based upon the type of the alert message and the identity of the user; and rendering the transformed alert message in the virtual environment for display to the user based upon the visual layout, the user behavior, the user preferences, and the features of the virtual environment.

10. The system of claim 9, wherein the one or more user-specific data elements comprise at least one of account information, profile information, and preference information retrieved from a database of the server computing device and associated with the identity of the user.

11. The system of claim 1, wherein detecting the user interaction with one or more of the configured user interaction elements comprises detecting a physical interaction by the user with a physical object in the physical environment that corresponds to one or more of the configured user interaction elements in the virtual environment, and wherein the transaction is initiated based upon the detected physical interaction.

12. A computerized method of dynamically generating and rendering a virtual reality environment adapted to features and constraints of a surrounding physical environment, the method comprising:

capturing, by a server computing device, a plurality of features of (i) a physical environment in which a virtual reality headset device is located and (ii) one or more objects in the physical environment;

generating, by the server computing device for display in the virtual reality headset device, a virtual environment that includes one or more virtual objects based upon an identity of a user of the headset device, the physical environment features, and the physical object features, including adapting the virtual environment to conform to one or more constraints of the physical environment;

configuring, by the server computing device, one or more user interaction elements, including one or more of the virtual objects, in the virtual environment based upon one or more of user behavior, user preferences, and features of the virtual environment, wherein a user interaction with the configured user interaction elements is associated with initiating a transaction;

causing, by the server computing device, the virtual reality headset device to render the virtual environment for display to the user;

detecting, by the server computing device, an alert message intended for the user;

transforming, by the server computing device, the alert message for display in the virtual environment based upon the user behavior, the user preferences, and the features of the virtual environment, including adapting a visual appearance of one or more of the virtual objects in the virtual environment based upon a type of the alert message and content of the alert message by merging one or more user-specific data elements with the content of the alert message into the visual appearance of the one or more virtual objects;

causing, by the server computing device, the virtual reality headset device to display the transformed alert message in the virtual environment to focus the user's attention on the transformed alert message;

detecting, by the server computing device, a user interaction with one or more of the configured user interaction elements in the virtual environment;

determining, by the server computing device, a transaction to be initiated based upon one or more features of the user interaction; and initiating, by the server computing device, the transaction, including causing the virtual reality headset device to display a transaction confirmation message in the virtual environment based upon the user behavior, the user preferences, and the features of the virtual environment.

13. The method of claim 12, wherein capturing features of the physical environment comprises scanning the physical environment using a sensor of the virtual reality headset device to identify spatial dimensions of the physical environment, identifying the physical environment and loading spatial dimensions of the physical environment from a data store, or both.

14. The method of claim 12, wherein capturing features of objects in the physical environment comprises detecting objects in the physical environment and scanning the detected objects using a sensor of the virtual reality headset device to identify physical attributes of the detected objects, identifying objects in the physical environment and loading physical attributes of the detected objects from a data store, or both.

15. The method of claim 14, wherein capturing features of objects in the physical environment comprises tracking movement of the objects in the physical environment.

16. The method of claim 12, wherein the virtual environment generated for display in the virtual reality headset device comprises a vector-based three-dimensional (3D) model.

17. The method of claim 16, wherein adapting the virtual environment to conform to one or more constraints of the physical environment comprises modifying one or more spatial dimensions of the vector-based 3D model to align with corresponding spatial dimensions of the physical environment.

18. The method of claim 12, wherein the user behavior comprises biometric information collected by the virtual reality headset device, gaze information collected by the virtual reality headset device, and gesture information collected by the virtual reality headset device.

19. The method of claim 12, wherein the user preferences comprise data display preferences, object display preferences, and interaction method preferences.

20. The method of claim 12, wherein transforming the alert message for display in the virtual environment comprises:

determining a visual layout for the alert message in the virtual environment based upon the type of the alert message and the identity of the user; and rendering the transformed alert message in the virtual environment for display to the user based upon the visual layout, the user behavior, the user preferences, and the features of the virtual environment.

21. The method of claim 20, wherein transforming the alert message for display in the virtual environment comprises merging one or more user-specific data elements with content of the alert message.

22. The method of claim 12, wherein detecting the user interaction with one or more of the configured user interaction elements comprises detecting a physical interaction by the user with a physical object in the physical environment that corresponds to one or more of the configured user interaction elements in the virtual environment, and wherein the transaction is initiated based upon the detected physical interaction.

* * * * *